(12) United States Patent
Rachamadugu

(10) Patent No.: US 11,995,134 B2
(45) Date of Patent: May 28, 2024

(54) GENERATING VALIDITY SCORES OF CONTENT ITEMS

(71) Applicant: Oath Inc., New York, NY (US)

(72) Inventor: Sreenivas Rachamadugu, Broadlands, VA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 16/731,117

(22) Filed: Dec. 31, 2019

(65) Prior Publication Data

US 2021/0200820 A1 Jul. 1, 2021

(51) Int. Cl.
*G06F 16/951* (2019.01)
*G06F 16/904* (2019.01)
*G06F 16/908* (2019.01)
*G06F 16/9535* (2019.01)

(52) U.S. Cl.
CPC .......... *G06F 16/951* (2019.01); *G06F 16/904* (2019.01); *G06F 16/908* (2019.01); *G06F 16/9535* (2019.01)

(58) Field of Classification Search
CPC .. G06F 16/2457; G06F 16/122; G06F 16/951; G06F 16/904; G06F 16/9535; G06F 16/908
See application file for complete search history.

(56) References Cited

U.S. PATENT DOCUMENTS

| | | | |
|---|---|---|---|
| 10,891,959 B1* | 1/2021 | Moeller | H04L 67/2842 |
| 2013/0282504 A1* | 10/2013 | Lessin | G06Q 50/184 |
| | | | 705/26.1 |
| 2014/0351046 A1* | 11/2014 | Carlyle | G06Q 30/0255 |
| | | | 705/14.53 |
| 2016/0085744 A1* | 3/2016 | Dunn | G06F 40/30 |
| | | | 704/9 |
| 2016/0259797 A1* | 9/2016 | Lewis | G06F 16/24578 |
| 2016/0291914 A1* | 10/2016 | Yu | G06Q 30/0269 |
| 2016/0358489 A1* | 12/2016 | Canter | G06N 5/04 |
| 2017/0142044 A1* | 5/2017 | Ball | G06Q 30/02 |
| 2019/0035431 A1* | 1/2019 | Attorre | G10L 17/00 |
| 2019/0080366 A1* | 3/2019 | Zhou | G06Q 50/01 |
| 2020/0394673 A1* | 12/2020 | Roberts | G06Q 30/0641 |
| 2021/0073302 A1* | 3/2021 | Srinivasaraghavan | G06F 40/205 |
| 2021/0117417 A1* | 4/2021 | Hendrickson | G06N 20/00 |
| 2021/0240836 A1* | 8/2021 | Hazony | G09B 5/00 |

* cited by examiner

*Primary Examiner* — Albert M Phillips, III
*Assistant Examiner* — Courtney Harmon
(74) *Attorney, Agent, or Firm* — Cooper Legal Group LLC

(57) ABSTRACT

One or more computing devices, systems, and/or methods are provided. A first content item may be identified. The first content item may be analyzed to determine a first set of content information associated with the first content item. The first set of content information may be indicative of a type of content associated with the first content item, a topic associated with the first content item, a publisher associated with the first content item, an author associated with the first content item and/or a producer associated with the first content item. A first validity score associated with the first content item may be generated based upon the first set of content information. A graphical user interface of a first client device may be controlled based upon the first validity score.

20 Claims, 15 Drawing Sheets

501

502

Title: Diggle Loses Election

Authors:
Jane Wildly
Joe Traymor

Publisher: Thompson Reporting Inc

John Diggle lost the election on Tuesday. For some, it was a very upsetting loss.

Diggle started his campaign back in November of 2018. Some supporters admired him for the changes he spoke of during his campaign.

Diggle has supporters throughout the country. States where Diggle won the vote include Texas, Tennessee, Kentucky, Utah and Colorado.

Diggle expressed sadness but also hope. In a message to contributors to his campaign and to his supporters, he said "We've lost the election, but we must remain proud for what we've done."

Many politicians have expressed uncertainty in light of the upset for Diggle's party. Terry Bower, of Colorado, stated that "Diggle was the best candidate for the job. It's unfortunate that he lost the election."

FIG. 5A

GENERATING VALIDITY SCORES OF CONTENT ITEMS

BACKGROUND

Many services, such as websites, applications, etc. may provide platforms for viewing media. For example, a user may interact with a service. The user may consume content, such as articles, videos, music, etc. using the service.

SUMMARY

In accordance with the present disclosure, one or more computing devices and/or methods are provided. In an example, a first content item may be identified. The first content item may be analyzed to determine a first set of content information associated with the first content item (e.g., the first set of content information may comprise content metadata associated with the first content item). The first set of content information may be indicative of a type of content associated with the first content item, a topic associated with the first content item, a publisher associated with the first content item, an author associated with the first content item and/or a producer associated with the first content item. A first validity score associated with the first content item may be generated based upon the first set of content information. A graphical user interface of a first client device may be controlled based upon the first validity score.

In an example, a first content item may be identified. The first content item may be analyzed to determine a first set of content information associated with the first content item (e.g., the first set of content information may comprise content metadata associated with the first content item). The first set of content information may be indicative of a type of content associated with the first content item, a topic associated with the first content item, a publisher associated with the first content item, an author associated with the first content item and/or a producer associated with the first content item. A first validity score associated with the first content item may be generated based upon the first set of content information. A request for content associated with a first client device may be received. The request for content may correspond to a request to be provided with a content item for presentation on an internet resource comprising the first content item. A plurality of bid values associated with a plurality of content items may be determined based upon one or more validity scores associated with the first content item. The one or more validity scores may comprise the first validity score. A second content item may be selected for presentation via the first client device based upon the plurality of bid values. The second content item may be presented via the first client device.

In an example, a first content item may be identified. The first content item may be analyzed to determine a first set of content information associated with the first content item (e.g., the first set of content information may comprise content metadata associated with the first content item). A first validity score associated with the first content item may be generated based upon the first set of content information. A graphical user interface of a first client device may be controlled based upon the first validity score.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5A is a diagram illustrating an exemplary system for generating validity scores associated with content items and/or controlling graphical user interfaces of client devices based upon the validity scores, where an article is provided.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
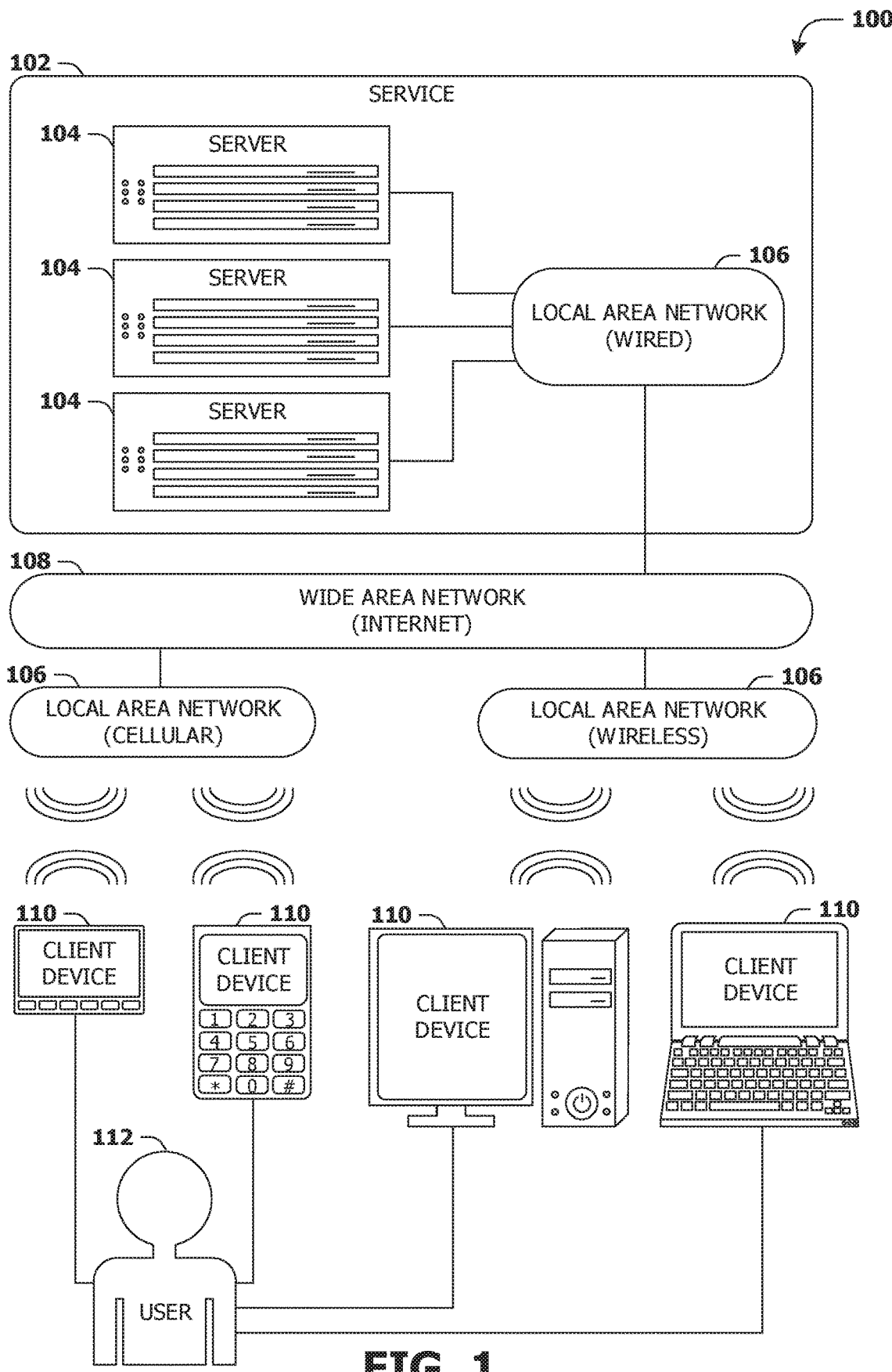
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
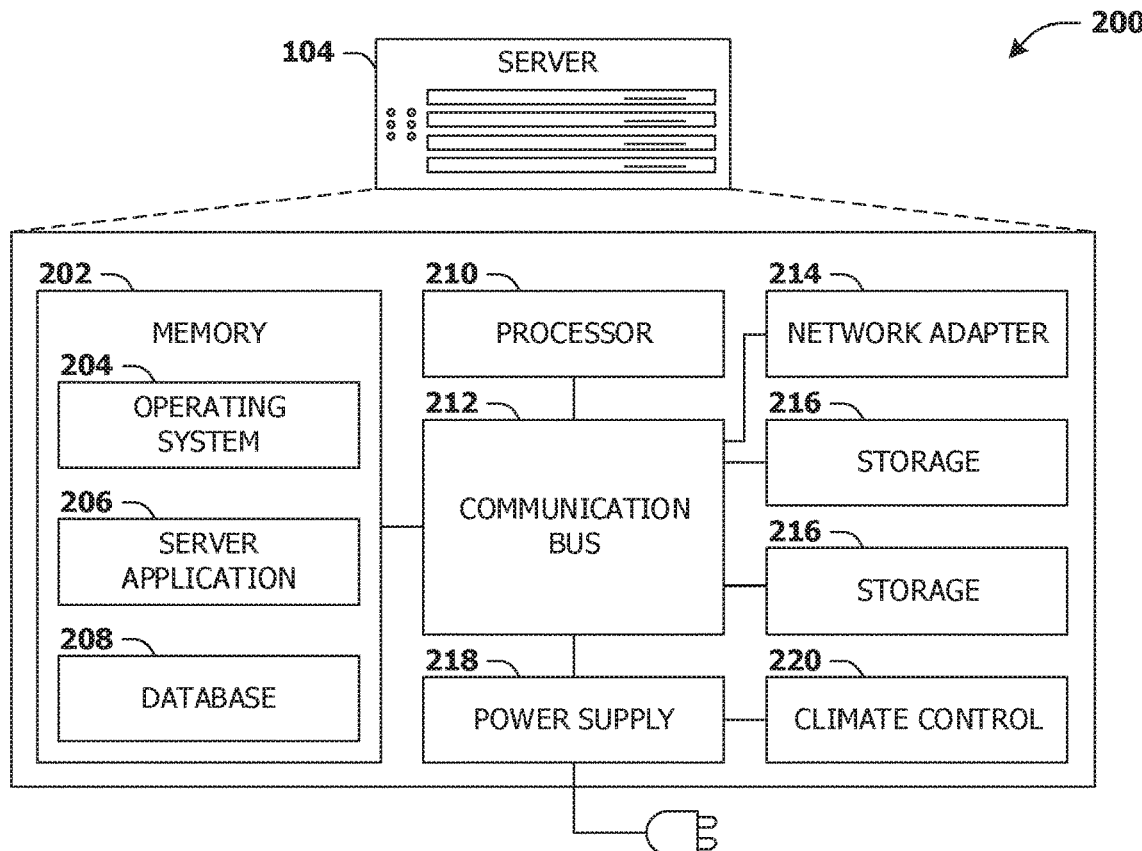
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
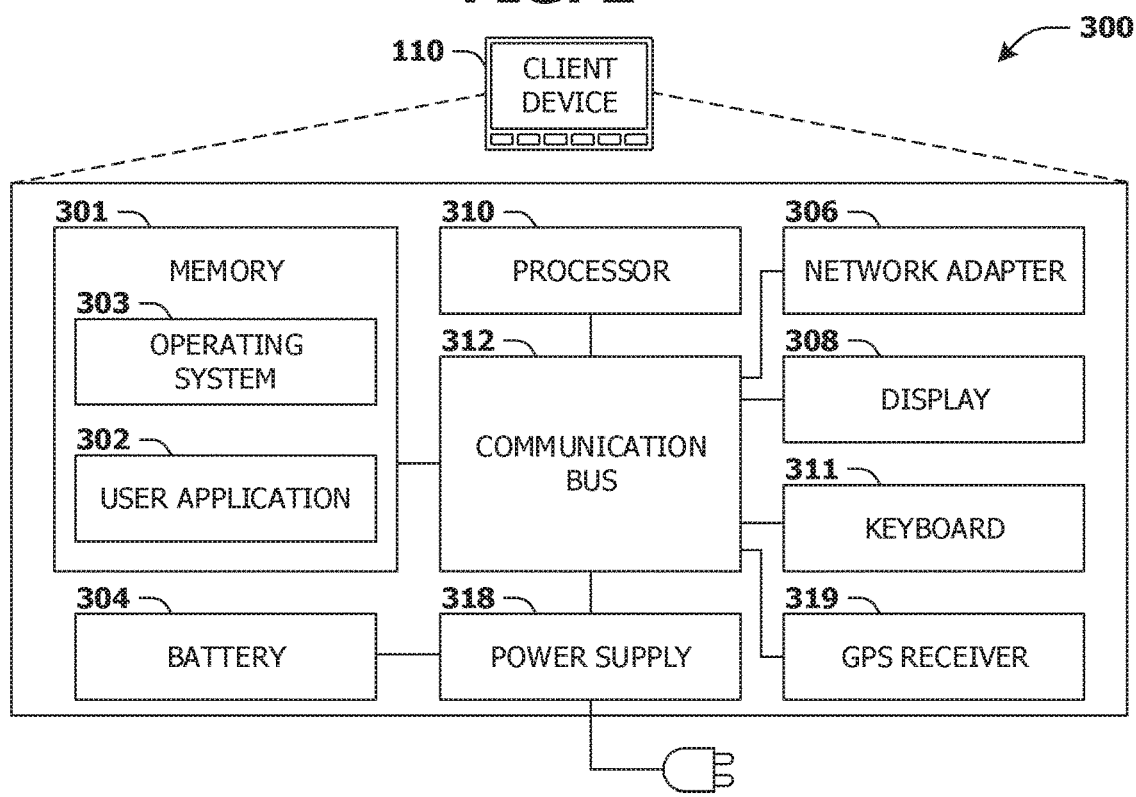
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 110 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating validity scores associated with content items are provided. For example, a user (and/or a device associated with the user) may access and/or interact with a service, such as a browser, software, a website, an application, an operating system, etc. that provides a platform for viewing and/or downloading content from one or more content providers. For example, a first content item may be presented to the user via the service. The first content item may comprise misleading, false and/or unproven information, such as about an issue. The user may not know that information provided by the first content item is misleading, false and/or unproven. Thus, the user may form an opinion about the issue and/or perform one or more actions associated with the issue based upon the misleading, false and/or unproven information. Alternatively and/or additionally, a second content item, such as an advertisement that promotes a product associated with a brand, may be presented concurrently with the first content item to the user. The second content item being presented concurrently with the first content item may be interpreted by users as the brand having an affiliation with providers of misleading, false and/or unproven information, such as misinformation. Accordingly, the second content item being presented concurrently with the first content item may damage a reputation of the brand.

Thus, in accordance with one or more of the techniques presented herein, the first content item may be analyzed to determine a first set of content information associated with the first content item. In some examples, the first set of content information may comprise content metadata associated with the first content item. The first set of content information is indicative of a type of content associated with the first content item, a topic associated with the first content item, a publisher associated with the first content item, an author associated with the first content item and/or a producer associated with the first content item. A first validity score associated with the first content item may be generated based upon the first set of content information. A graphical user interface of the first client device may be controlled based upon the first validity score. In an example, the first validity score may be displayed concurrently with the first content item. Accordingly, the user can determine whether the first content item comprises misleading, false and/or unproven information without having to research about the first content item. Alternatively and/or additionally, the second content item may be selected for presentation concurrently with the first content item based upon a determination that the first validity score meets a threshold validity score (e.g., the second content item may not be presented concurrently with the first content item based upon a determination that the first validity score does not meet the threshold validity score). Accordingly, the reputation of the brand may not be damaged.

Figure 4:
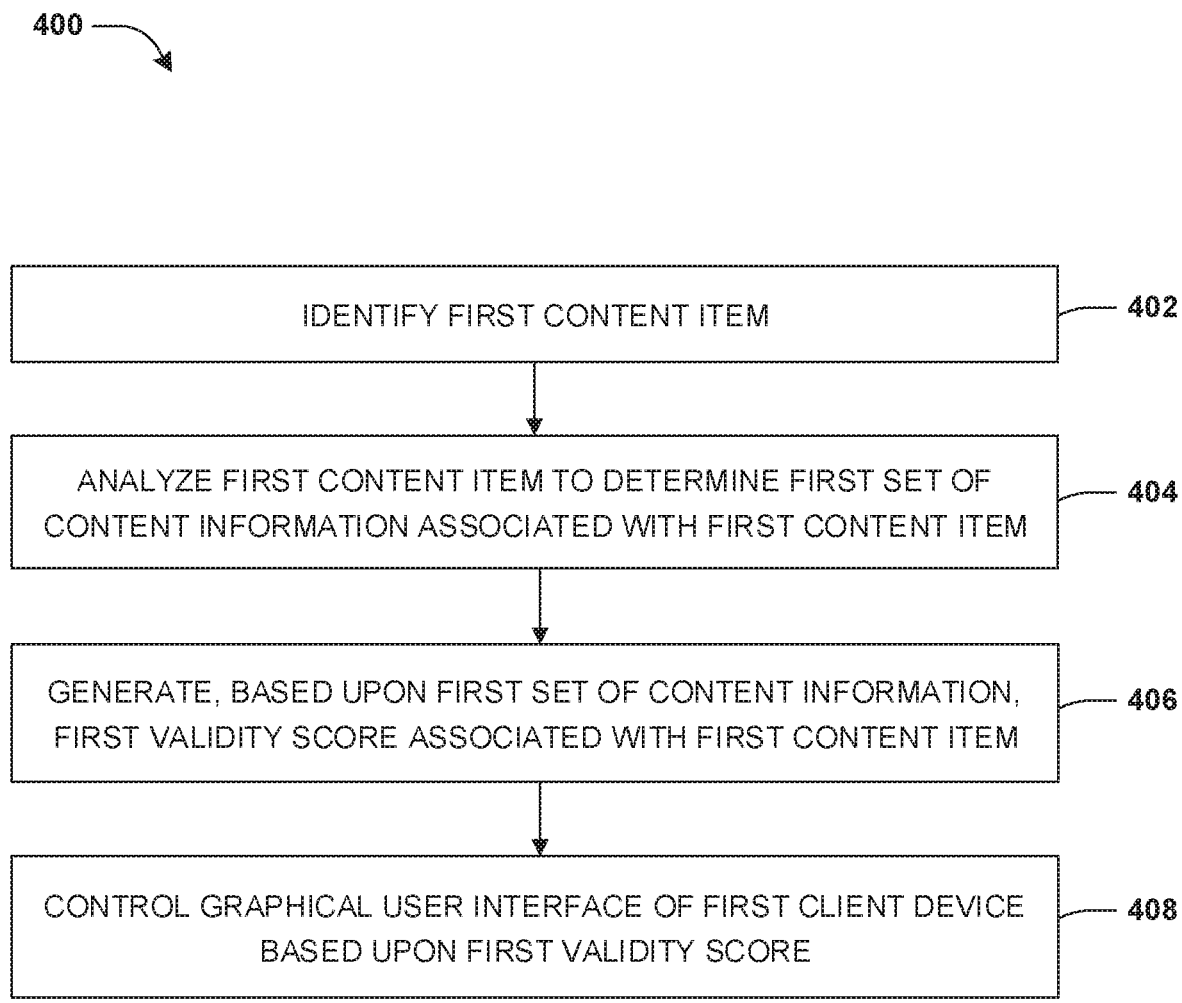
FIG. 4 is a flow chart illustrating an example method for generating validity scores associated with content items.

An embodiment of generating validity scores associated with content items is illustrated by an example method 400 of FIG. 4. A content system for presenting content via client devices may be provided. For example, client devices may access and/or interact with one or more services, such as one or more web pages, one or more applications, one or more content interfaces, etc. for viewing and/or downloading content items from one or more servers associated with the content system. For example, the content items may comprise at least one of articles (e.g., news articles, educational articles, research papers, etc.), video content items (e.g., news-related videos, news channel video clips, internet news video clips, educational videos, how-to videos, educational video clips, documentaries, entertainment videos, sports-related video clip, informational videos, interview-related videos, video clips of meetings, etc.), audio content items (e.g., news-related audio segments, podcasts, music, etc.), virtual reality (VR) content, augmented reality (AR) content, mixed reality (MR) content, virtual reality (VR) content, extended reality (XR) content, emails from an organization and/or a company (e.g., emails comprising content about an issue, subscription-based emails, etc.), etc.

At 402, a first content item and/or content metadata associated with the first content item may be identified. In some examples, the first content item may be identified within a content item database associated with the content system. Alternatively and/or additionally, the first content item may be identified responsive to the first content item being included (e.g., stored) in the content item database (and/or responsive to the first content item being uploaded to the content item database). Alternatively and/or additionally, the first content item may be identified responsive to the first content item being published and/or accessible via one or more services (such as one or more web pages, one or more applications, one or more content interfaces, etc.) associated with the content system.

Alternatively and/or additionally, the first content item may be identified based upon an image (e.g., a video frame of a video) and/or a video. The image may be captured and/or the video may be recorded by a device. In an example, the device may correspond to a smartphone camera, a camera of a wearable device (e.g., a smart glasses computer comprising a camera, a headset comprising a camera, a smart watch comprising a camera, etc.), a stand-alone camera (e.g., a security camera), etc. For example, the image and/or the video may be received from the device and/or a different device. In some examples, the image and/or the video may be received in real time from the device and/or the different device (and/or the image and/or the video may be received with a threshold amount of delay from the time that the image is captured and/or the video is recorded).

In some examples, the first content item may be identified within the image and/or the video. For example, the image and/or the video may be analyzed to identify a first object (within the image and/or the video) that corresponds to the first content item. For example, the first object may be identified by performing one or more image processing techniques and/or one or more computer vision techniques on the image and/or the video. Alternatively and/or additionally, the image and/or the video may be analyzed using one or more object detection techniques (and/or one or more object segmentation techniques) to detect the first object.

In some examples, the first object may be analyzed to determine that the first object corresponds to the first content item. In an example where the first content item is a publication (e.g., a book, a research article, a news article and/or a different type of publication), the first object may be analyzed to determine a title, a cover, a picture and/or one or more words (e.g., the title, the cover, the picture and/or the one or more words may be visible in the image and/or the video). The title, the cover, the picture and/or the one or more words may be compared with one or more databases of publications to determine that the first object corresponds to the publication. For example, the publication may be identified by analyzing the one or more databases of publications based upon the title, the cover, the picture and/or the one or more words.

In an example where the first content item is a video clip (e.g., a news channel video clip, a television show, a documentary, etc.), the first object may correspond to a display device, such as a television and/or a monitor displaying the video clip. One or more databases of videos may be analyzed based upon the first object (and/or the image and/or the video) to determine that the video clip is being displayed by the display device. For example, the video clip may be identified by analyzing the one or more databases of videos based upon the first object (and/or the image and/or the video).

At 404, the first content item may be analyzed to determine a first set of content information associated with the first content item. In some examples, the first set of content information may comprise at least some of the content metadata associated with the first content item. Alternatively and/or additionally, the first set of content information may be determined based upon the content metadata and/or other information associated with the first content item. In some examples, the first set of content information may comprise a first type of content associated with the first content item, a first topic associated with the first content item, a first publisher associated with the first content item, a first author associated with the first content item, a first producer associated with the first content item and/or one or more first sources of data associated with the first content item.

In some examples, the content item database may comprise a plurality of sets of information associated with a plurality of content items of the content item database. For example, a first set of information of the plurality of sets of information may be associated with the first content item. In some examples, at least some of the first set of content information may be determined based upon the first set of information.

In some examples, the first type of content may be indicative of a content format and/or a content category of the first content item, such as at least one of a book, an article, a news article, an educational article, a research paper, a blog post, a post on a forum, a video content item, a news-related video, a news channel video clip, an internet news video clip, an educational video, a how-to video, an educational video clip, a documentary, an entertainment video, a sports-related video clip, an informational video, an interview-related video, a video clip of a meeting, an audio content item, a news-related audio segment, a podcast, music, an email, an email from an organization and/or a company an email comprising content about an issue, a subscription-based email, VR content, AR content, MR content, XR content, etc.

In some examples, the first topic may be indicative of one or more topics associated with subject matter of the first content item. In an example where the first content item is a news-related content item, the first topic may correspond to at least one of The Economy, Politics, Business News, The United States, International News, The White House, Entertainment, Celebrity News, Science News, Technology, Health News, etc. In an example where the first content item is a travel-related content item, the first topic may correspond to at least one of Travel destinations, Cuisine, Transportation, Cost-friendliness, Asia Tourism, South America Tourism, Africa Tourism, etc.

In some examples, the first topic may be indicative of one or more entities associated with the first content item, such as at least one of places (e.g., countries, cities, geographic locations, etc.), people (e.g., people of a particular location, people with a particular occupation, politicians, celebrities, socialites, etc.), things (e.g., devices, natural objects, etc.), organizations, ideas, systems, events, historical events, current events, abstract objects, physical objects, etc.

In some examples, the first topic may be determined based upon the first set of information. For example, the first set of information may comprise information (e.g., keywords, tags, etc.) associated with subject matter of the first content item (e.g., the first topic may be determined based upon the information). Alternatively and/or additionally, the first topic may be determined by analyzing the first content item. In an example where the first content item is an article comprising text (and/or a different type of content item comprising text), the text may be analyzed and/or compared with one or more informational resources (e.g., an encyclopedia, a web encyclopedia, a news channel, a news website, a website, a book, a research article, a research article database and/or a different type of informational resource, etc.) to identify the one or more entities (e.g., the one or more entities may be determined using one or more named-entity recognition (NER) techniques) and/or to identify the one or more topics (e.g., the one or more topics may be determined using one or more multi-label learning (MLL) techniques).

In an example where the first content item comprises video content and/or audio content, a transcript associated with audio data of the first content item may be determined (e.g., the audio data may be transcribed to determine the transcript). The transcript may be analyzed to determine the first topic.

In an example where the first content item comprises one or more images and/or video content, one or more first images of the first content item may be identified. For example, the one or more first images may comprise images within an article. Alternatively and/or additionally, the one or more first images may correspond to one or more video frames of video content of the first content item. The one or more first images may be analyzed using one or more image processing techniques (e.g., at least one of computer vision techniques, object detection techniques, object identification techniques, etc.) to identify one or more objects within the one or more first images. In some examples, the one or more objects may be analyzed and/or compared with object information and/or other images (such as using one or more computer vision techniques and/or one or more object identification techniques) to determine that the one or more objects match one or more entities and/or to determine the first topic associated with the first content item.

In some examples, the first publisher may correspond to an entity (e.g., a website, an application, a service, a periodical publication, a company, a person and/or an organization) that publishes and/or distributes the first content item. For example, the first publisher may correspond to a newspaper, a magazine, a journal, a newsletter, an internet publication resource, etc. and/or a company and/or an organization that owns and/or administers the newspaper, the magazine, the journal, the newsletter, the internet publication resource, etc.

In some examples, the first author may correspond to an entity (e.g., a person, a company, an organization) that creates and/or originates the first content item. In an example where the first content item is a book and/or an article, the first author may correspond to a writer of the book and/or the article. In an example where the first content item is a video, the first author may correspond to at least one of a creator, a writer, a director, etc. of the video.

In some examples, the first producer may correspond to an entity (e.g., a person, a company, an organization, etc.) that funds, distributes, manages and/or oversees production of the first content item.

In some examples, the one or more first sources of data may correspond to one or more sources of data relied upon as sources of data of the first content item. In an example, the one or more first sources of data may comprise a content item (e.g., an article, a book, a research paper, etc.). Alternatively and/or additionally, the one or more first sources of data may comprise an entity (e.g., a company, an organization, a person item, a public official, etc. that provides information used to create the first content). In some examples, a source of data of the one or more first sources of data may be identified based upon a list of cited sources (e.g., a list of references) of the first content item (e.g., the source of data may be identified based upon a determination that the source of data is included in the list of cited sources). Alternatively and/or additionally, a source of data of the one or more first sources of data may be identified by analyzing the first content item to identify quotation marks and/or indications of a quote by an entity (e.g., the source of data may be identified based upon a determination that the source of data is a source and/or provider of the quote). Alternatively and/or additionally, a source of data of the one or more first sources of data may be identified by analyzing the first content item to determine that information of the first content item is provided by the source of data. In an example, the first content item may comprise "The Health Organization provided a statement that kidney beans grown by Kidney Corp. are dangerous." The Health Organization may be identified to be a source of data of the one or more first sources of data based upon a determination that information (e.g., kidney beans grown by Kidney Corp. are dangerous) of the first content is provided by The Health Organization.

In some examples, the first set of content information may comprise one or more first statements. For example, the first content item may be analyzed to identify the one or more first statements. In an example, a statement of the one or more first statements may correspond to an assertion of a fact (e.g., "the speed of light is greater than the speed of sound"). For example, a section of the first content item may be selected for inclusion in the one or more first statements based upon a determination that the section comprises an assertion of a fact. Alternatively and/or additionally, a section of the first content item may be selected for inclusion in the one or more first statements based upon a determination that the section is verifiable (and/or that a verifiability level of a fact asserted by the section exceeds a threshold level of verifiability). In an example, a first section of the first content item comprising "John Granger was born in Wisconsin in 1971" may be selected for inclusion in the one or more first statements based upon a determination that the first section comprises an assertion of one or more facts (e.g., a fact that John Granger was born in 1971 and/or a fact that John Granger was born in Wisconsin) and/or a determination that a fact asserted by the section is verifiable. In another example, a second section of the first content item comprising "I don't like John Granger" may not be selected for inclusion in the one or more first statements based upon a determination that the second section does not comprise an assertion of a fact (e.g., the second section merely expresses an opinion) and/or that the second section is not verifiable (and/or a verifiability level of the second section does not meet the threshold level of verifiability).

FIGS. 5A-5K illustrate examples of a system 501 for generating validity scores associated with content items and/or controlling graphical user interfaces of client devices based upon the validity scores, described with respect to the example method 400 of FIG. 4.

Figure 5B:
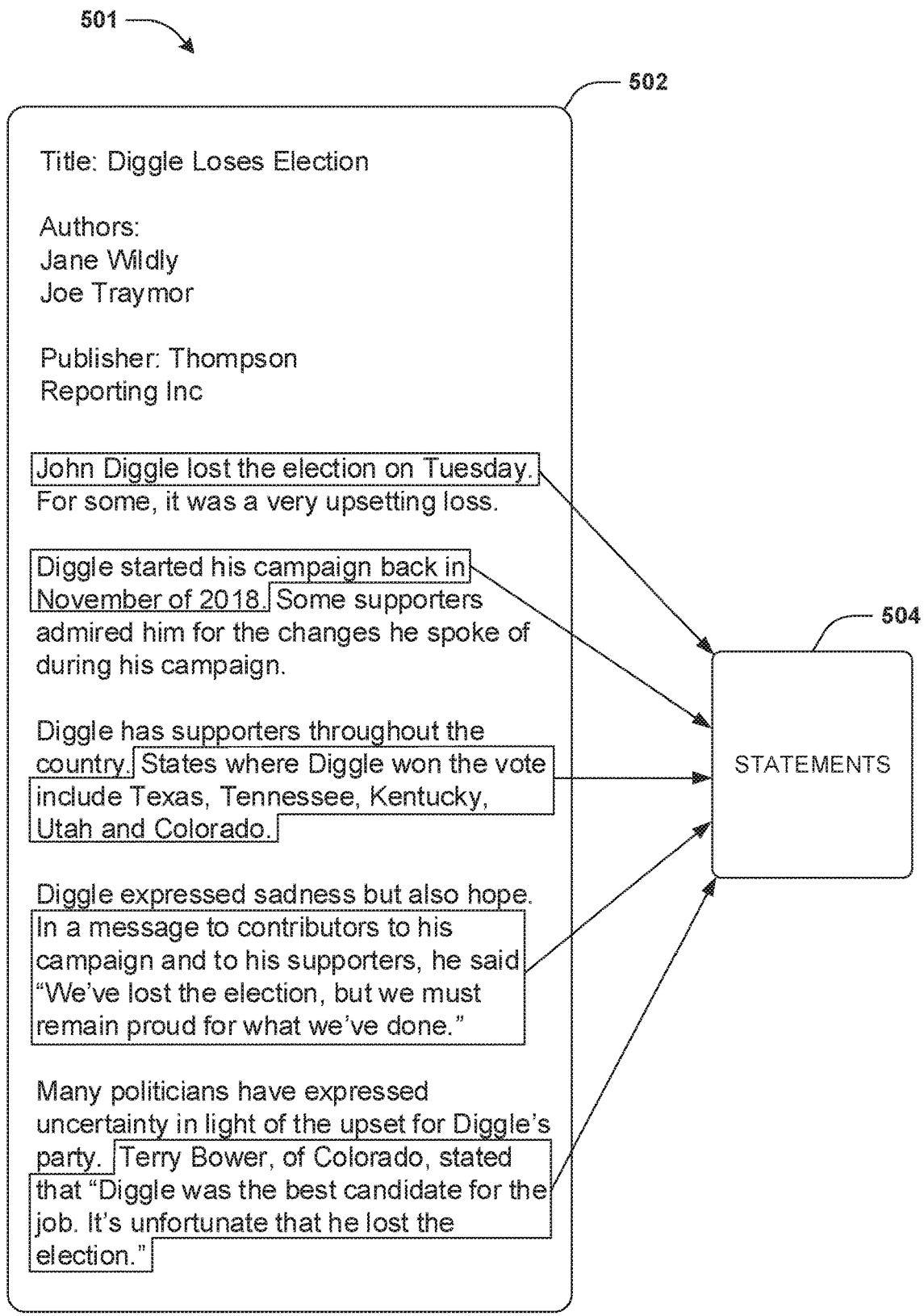
FIG. 5B is a diagram illustrating an exemplary system for generating validity scores associated with content items and/or controlling graphical user interfaces of client devices based upon the validity scores, where an article is analyzed to identify a first set of statements.

FIG. 5A illustrates an article 502 (e.g., a news article). In an example, the first content item may comprise the article 502. FIG. 5B illustrates the article 502 being analyzed to identify a first set of statements 504. In an example, the one or more first statements may comprise the first set of statements 504. In some examples, the first set of statements 504 may be identified based upon a determination that statements of the first set of statements 504 comprises assertions of fact and/or are verifiable.

In some examples, the first set of content information may comprise one or more different characteristics of the first set of content information different than the first type of content, the first topic, the first publisher, the first author, the first producer, the one or more first sources of data and/or the one or more first statements.

At 406, a first validity score associated with the first content item may be generated based upon the first set of content information and/or the content metadata associated with the first content item. In some examples, the first validity score may be indicative of a measure of validity, authenticity, accuracy and/or correctness of information expressed by the first content item. Alternatively and/or additionally, the first validity score may be indicative of a probability that information expressed by the first content item is well-founded, valid, authentic, accurate and/or correct. Alternatively and/or additionally, the first validity score may be indicative of a probability that information expressed by the first content item is not invalid, incorrect and/or misleading (and/or that the first content item does not comprise misinformation). Alternatively and/or additionally, the first validity score may be indicative of a quality of the first content item with respect to validity, authenticity, correctness and/or accuracy of information expressed by the first content item.

In some examples, a validity score database may be analyzed based upon the first type of content to identify a first set of validity scores associated with a first set of content items associated with the first type of content. In some examples, the validity score database may comprise validity scores associated with content items. In an example where the first type of content of the first content item corresponds to a podcast, the first set of content items may correspond to podcasts. In some examples, the first validity score may be generated based upon the first set of validity scores. For example, a content type validity score may be generated based upon the first set of validity scores associated with the first type of content. For example, one or more operations (e.g., mathematical operations) may be performed using the first set of validity scores to generate the content type validity score. In an example, an average (and/or a different combination) of the first set of validity scores may be determined to generate the content type validity score. In some examples, the first validity score may be generated based upon the content type validity score.

Alternatively and/or additionally, validity information associated with validity services, such as journals, content platforms, fact-checking websites, verification services and/or other types of content services may be analyzed based upon the first type of content to generate the first validity score and/or the content type validity score. In an example, the validity information may comprise publications, such as fact-checking reports, verification reports, peer-review articles, critiques, editorials, content reviews and/or other types of content related to a content item.

In some examples, the validity information associated with the validity services may be analyzed based upon the first type of content to identify a first set of validity information associated with content items corresponding to the first type of content. For example, the first set of validity information may comprise at least one of one or more fact-checking reports related to content items corresponding to the first type of content, one or more verification reports related to content items corresponding to the first type of content, one or more peer-review articles related to content items corresponding to the first type of content, one or more critiques related to content items corresponding to the first type of content, one or more editorials related to content items corresponding to the first type of content, one or more content reviews related to content items corresponding to the first type of content, etc.

In some examples, the first validity score and/or the content type validity score may be generated based upon the first set of validity information. In some examples, the first set of validity information may comprise an indication that statements expressed by a content item corresponding to the first type of content are valid (e.g., correct). Alternatively and/or additionally, the first set of validity information may comprise an indication that statements expressed by a content item corresponding to the first type of content are invalid (e.g., incorrect and/or misleading). In some examples, the first set of validity information may be analyzed to determine a measure of validity of content items corresponding to the first type of content. For example, the first set of validity information may be analyzed to determine a quantity of invalid content items (e.g., content items corresponding to the first type of content that are identified by the first set of validity information as having incorrect and/or misleading statements) and/or a quantity of valid content items (e.g., content items corresponding to the first type of content that are identified by the first set of validity information as having correct statements and/or not having incorrect and/or misleading statements). The measure of validity of content items corresponding to the first type of content may be determined based upon the quantity of invalid content items and/or the quantity of valid content items. In some examples, the content type validity score and/or the first validity score may be generated based upon the measure of validity of content items corresponding to the first type of content.

In some examples, the validity score database may be analyzed based upon the first topic to identify a second set of validity scores associated with a second set of content items associated with the first topic. In an example where the first topic of the first content item corresponds to politics, the second set of content items may be associated with politics. In some examples, the first validity score may be generated based upon the second set of validity scores. For example, a topic validity score may be generated based upon the second set of validity scores associated with the first topic. For example, one or more operations (e.g., mathematical operations) may be performed using the second set of validity scores to generate the topic validity score. In an example, an average (and/or a different combination) of the second set of validity scores may be determined to generate the topic validity score. In some examples, the first validity score may be generated based upon the topic validity score.

In some examples, the validity information associated with the validity services may be analyzed based upon the first topic to identify a second set of validity information associated with content items corresponding to the first topic. For example, the second set of validity information may comprise at least one of one or more fact-checking reports related to content items corresponding to the first topic, one or more verification reports related to content items corresponding to the first topic, one or more peer-review articles related to content items corresponding to the first topic, one or more critiques related to content items corresponding to the first topic, one or more editorials related to content items corresponding to the first topic, one or more content reviews related to content items corresponding to the first topic, etc.

In some examples, the first validity score and/or the topic validity score may be generated based upon the second set of validity information. In some examples, the second set of validity information may comprise an indication that statements expressed by a content item corresponding to the first topic are valid (e.g., correct). Alternatively and/or additionally, the second set of validity information may comprise an indication that statements expressed by a content item corresponding to the first topic are invalid (e.g., incorrect and/or misleading). In some examples, the second set of validity information may be analyzed to determine a measure of validity of content items corresponding to the first topic. For example, the second set of validity information may be analyzed to determine a quantity of invalid content items (e.g., content items corresponding to the first topic that are identified by the second set of validity information as having incorrect and/or misleading statements) and/or a quantity of valid content items (e.g., content items corresponding to the first topic that are identified by the second set of validity information as having correct statements and/or not having incorrect and/or misleading statements). The measure of validity of content items corresponding to the first topic may be determined based upon the quantity of invalid content items and/or the quantity of valid content items. In some examples, the topic validity score and/or the first validity score may be generated based upon the measure of validity of content items corresponding to the first topic.

In some examples, the validity score database may be analyzed based upon the first publisher to identify a third set of validity scores associated with a third set of content items associated with the first publisher. For example, the third set of content items may be published by the first publisher. In some examples, the third set of content items may be associated with a first period of time. For example, the third set of content items may be published within the first period of time. The first period of time may correspond to a window of time from a first time to a current time (e.g., the first time may be before the current time, such as a week, a month, a year and/or a different duration of time before the current time). In some examples, the first validity score may be generated based upon the third set of validity scores. For example, a publisher validity score may be generated based upon the third set of validity scores associated with the first publisher. For example, one or more operations (e.g., mathematical operations) may be performed using the third set of validity scores to generate the publisher validity score. In an example, an average (and/or a different combination) of the third set of validity scores may be determined to generate the publisher validity score. In some examples, the first validity score may be generated based upon the publisher validity score.

In some examples, the validity information associated with the validity services may be analyzed based upon the first publisher to identify a third set of validity information associated with content items associated with the first publisher. For example, the third set of validity information may comprise at least one of one or more fact-checking reports related to content items associated with the first publisher, one or more verification reports related to content items associated with the first publisher, one or more peer-review articles related to content items associated with the first publisher, one or more critiques related to content items associated with the first publisher, one or more editorials related to content items associated with the first publisher, one or more content reviews related to content items associated with the first publisher, etc.

In some examples, the first validity score and/or the publisher validity score may be generated based upon the third set of validity information. In some examples, the third set of validity information may comprise an indication that statements expressed by a content item associated with the first publisher are valid (e.g., correct). Alternatively and/or additionally, the third set of validity information may comprise an indication that statements expressed by a content item associated with the first publisher are invalid (e.g., incorrect and/or misleading). In some examples, the third set of validity information may be analyzed to determine a measure of validity of content items associated with the first publisher. For example, the third set of validity information may be analyzed to determine a quantity of invalid content items (e.g., content items associated with the first publisher that are identified by the third set of validity information as having incorrect and/or misleading statements) and/or a quantity of valid content items (e.g., content items associated with the first publisher that are identified by the third set of validity information as having correct statements and/or not having incorrect and/or misleading statements). The measure of validity of content items associated with the first publisher may be determined based upon the quantity of invalid content items and/or the quantity of valid content items. In some examples, the publisher validity score and/or the first validity score may be generated based upon the measure of validity of content items associated with the first publisher.

In some examples, the validity score database may be analyzed based upon the first author to identify a fourth set of validity scores associated with a fourth set of content items associated with the first author. For example, the fourth set of content items may be written, originated and/or created by the first author. In some examples, the fourth set of content items may be associated with a second period of time. In some examples, the second period of time may be the same as the first period of time. Alternatively and/or additionally, the second period of time may be different than the first period of time. For example, the fourth set of content items may be published within the second period of time. The second period of time may correspond to a window of time from a second time to the current time (e.g., the second time may be before a current time, such as a week, a month, a year and/or a different duration of time before the current time). In some examples, the first validity score may be generated based upon the fourth set of validity scores. For example, an author validity score may be generated based upon the fourth set of validity scores associated with the first author. For example, one or more operations (e.g., mathematical operations) may be performed using the fourth set of validity scores to generate the author validity score. In an example, an average (and/or a different combination) of the fourth set of validity scores may be determined to generate the author validity score. In some examples, the first validity score may be generated based upon the author validity score.

In some examples, the validity information associated with the validity services may be analyzed based upon the first author to identify a fourth set of validity information associated with content items associated with the first author. For example, the fourth set of validity information may comprise at least one of one or more fact-checking reports related to content items associated with the first author, one or more verification reports related to content items associated with the first author, one or more peer-review articles related to content items associated with the first author, one or more critiques related to content items associated with the first author, one or more editorials related to content items associated with the first author, one or more content reviews related to content items associated with the first author, etc.

In some examples, the first validity score and/or the author validity score may be generated based upon the fourth set of validity information. In some examples, the fourth set of validity information may comprise an indication that statements expressed by a content item associated with the first author are valid (e.g., correct). Alternatively and/or additionally, the fourth set of validity information may comprise an indication that statements expressed by a content item associated with the first author are invalid (e.g., incorrect and/or misleading). In some examples, the fourth set of validity information may be analyzed to determine a measure of validity of content items associated with the first author. For example, the fourth set of validity information may be analyzed to determine a quantity of invalid content items (e.g., content items associated with the first author that are identified by the fourth set of validity information as having incorrect and/or misleading statements) and/or a quantity of valid content items (e.g., content items associated with the first author that are identified by the fourth set of validity information as having correct statements and/or not having incorrect and/or misleading statements). The measure of validity of content items associated with the first author may be determined based upon the quantity of invalid content items and/or the quantity of valid content items. In some examples, the author validity score and/or the first validity score may be generated based upon the measure of validity of content items associated with the first author.

In some examples, the validity score database may be analyzed based upon the first producer to identify a fifth set of validity scores associated with a fifth set of content items associated with the first producer. For example, the fifth set of content items may be produced by the first producer. In some examples, the first validity score may be generated based upon the fifth set of validity scores. For example, a producer validity score may be generated based upon the fifth set of validity scores associated with the first producer. For example, one or more operations (e.g., mathematical operations) may be performed using the fifth set of validity scores to generate the producer validity score. In an example, an average (and/or a different combination) of the fifth set of validity scores may be determined to generate the producer validity score. In some examples, the first validity score may be generated based upon the producer validity score.

In some examples, the validity information associated with the validity services may be analyzed based upon the first producer to identify a fifth set of validity information associated with content items associated with the first producer. For example, the fifth set of validity information may comprise at least one of one or more fact-checking reports related to content items associated with the first producer, one or more verification reports related to content items associated with the first producer, one or more peer-review articles related to content items associated with the first producer, one or more critiques related to content items associated with the first producer, one or more editorials related to content items associated with the first producer, one or more content reviews related to content items associated with the first producer, etc.

In some examples, the first validity score and/or the producer validity score may be generated based upon the fifth set of validity information. In some examples, the fifth set of validity information may comprise an indication that statements expressed by a content item associated with the first producer are valid (e.g., correct). Alternatively and/or additionally, the fifth set of validity information may comprise an indication that statements expressed by a content item associated with the first producer are invalid (e.g., incorrect and/or misleading). In some examples, the fifth set of validity information may be analyzed to determine a measure of validity of content items associated with the first producer. For example, the fifth set of validity information may be analyzed to determine a quantity of invalid content items (e.g., content items associated with the first producer that are identified by the fifth set of validity information as having incorrect and/or misleading statements) and/or a quantity of valid content items (e.g., content items associated with the first producer that are identified by the fifth set of validity information as having correct statements and/or not having incorrect and/or misleading statements). The measure of validity of content items associated with the first producer may be determined based upon the quantity of invalid content items and/or the quantity of valid content items. In some examples, the producer validity score and/or the first validity score may be generated based upon the measure of validity of content items associated with the first producer.

In some examples, the validity score database may be analyzed based upon the one or more first sources of data to identify a sixth set of validity scores associated with a sixth set of content items associated with the one or more first sources of data. In an example where the one or more first sources of data comprises one or more entities, one or more content items of the sixth set of content items may be written by, produced by, created by and/or published by the one or more entities. In an example where the one or more first sources of data comprises one or more content items, the sixth set of content items may comprise the one or more content items. In some examples, the first validity score may be generated based upon the sixth set of validity scores. For example, a source validity score may be generated based upon the sixth set of validity scores associated with the one or more first sources of data. For example, one or more operations (e.g., mathematical operations) may be performed using the sixth set of validity scores to generate the source validity score. In an example, an average (and/or a different combination) of the sixth set of validity scores may be determined to generate the source validity score. In some examples, the first validity score may be generated based upon the source validity score.

In some examples, the validity information associated with the validity services may be analyzed based upon the one or more first sources of data to identify a sixth set of validity information associated with content items associated with the one or more first sources of data. For example, the sixth set of validity information may comprise at least one of one or more fact-checking reports related to content items and/or statements associated with the one or more first sources of data, one or more verification reports related to content items and/or statements associated with the one or more first sources of data, one or more peer-review articles related to content items and/or statements associated with the one or more first sources of data, one or more critiques related to content items and/or statements associated with the one or more first sources of data, one or more editorials related to content items and/or statements associated with the one or more first sources of data, one or more content reviews related to content items and/or statements associated with the one or more first sources of data, etc.

In some examples, the first validity score and/or the source validity score may be generated based upon the sixth set of validity information. In some examples, the sixth set of validity information may comprise an indication that statements expressed by a content item associated with the one or more first sources of data are valid (e.g., correct). Alternatively and/or additionally, the sixth set of validity information may comprise an indication that statements expressed by a content item associated with the one or more first sources of data are invalid (e.g., incorrect and/or misleading). In some examples, the sixth set of validity information may be analyzed to determine a measure of validity of content items associated with the one or more first sources of data. For example, the sixth set of validity information may be analyzed to determine a quantity of invalid content items (e.g., content items associated with the one or more first sources of data that are identified by the sixth set of validity information as having incorrect and/or misleading statements) and/or a quantity of valid content items (e.g., content items associated with the one or more first sources of data that are identified by the sixth set of validity information as having correct statements and/or not having incorrect and/or misleading statements). The measure of validity of content items associated with the one or more first sources of data may be determined based upon the quantity of invalid content items and/or the quantity of valid content items. In some examples, the source validity score and/or the first validity score may be generated based upon the measure of validity of content items associated with the one or more first sources of data.

In some examples, one or more informational databases may be analyzed based upon the one or more first statements to identify one or more second statements associated with the one or more first statements. An informational database of the one or more informational databases may correspond to a web encyclopedia (e.g., a web-based encyclopedia). Alternatively and/or additionally, the one or more informational databases may comprise content of a news channel, content of a news website, content of a website, a database of books, a research article database, a database of journal publications, and/or a different type of informational database.

In some examples, a first exemplary statement of the one or more second statements may be identified based upon a determination that first exemplary subject matter, such as a topic, an entity and/or an issue, associated with the first exemplary statement matches (and/or is related to) second exemplary subject matter of a second exemplary statement of the one or more first statements. For example, the first exemplary statement of the one or more second statements may be analyzed to determine the first exemplary subject matter associated with the first exemplary statement. The first exemplary subject matter may be compared with the second exemplary subject matter to determine that the first exemplary subject matches and/or is related to the second exemplary subject matter.

Alternatively and/or additionally, a statement of the one or more second statements may be identified based upon a determination that one or more first words (such as words related to a topic, an entity and/or an issue) of the statement match (and/or are related to) one or more second words within a statement of the one or more first statements.

In an example, a first statement of the one or more first statements may comprise "Mercury is denser than hydrogen." A second statement of the one or more second statements may comprise "Mercury's density ranges from 13.69 g/cm$^3$ to 13.19 g/cm$^3$ at different states" and/or a third statement of the one or more second statements may comprise "Hydrogen's density is about 0.07 g/cm³." The second statement and/or the third statement may be identified based upon a determination that subject matter (e.g., physical properties of mercury and/or hydrogen) of the second statement and/or the third statement matches (and/or is related to) subject matter of the first statement.

In an example, a fourth statement of the one or more first statements may comprise "John Billy retired from FreshMax in 1998 and never returned." A fifth statement of the one or more second statements may comprise "John Billy stayed with FreshMax until 2000, when he retired for personal reasons." The fifth statement may be identified based upon a determination that subject matter (e.g., retirement of John Billy from FreshMax) of the fifth statement matches (and/or is related to) subject matter of the fourth statement.

The one or more first statements may be compared with the one or more second statements to determine comparison information. The comparison information may be indicative of one or more first sets of information (e.g., one or more asserted facts) of the one or more first statements compatible with the one or more second statements. For example, the one or more first sets of information may be corroborated by (e.g., supported by) the one or more second statements. In an example, the second statement (e.g., "Mercury's density ranges from 13.69 g/cm³ to 13.19 g/cm³ at different states") and/or the third statement (e.g., "Hydrogen's density is about 0.07 g/cm³") may be determined to be compatible with (e.g., corroborate and/or support) the first statement (e.g., "Mercury is denser than hydrogen").

In some examples, the comparison information may be indicative of one or more second sets of information (e.g., one or more asserted facts) of the one or more first statements in conflict with the one or more second statements. In an example, it may be determined that a set of information of the one or more first sets of information is in conflict with the one or more second statements based upon a determination that the one or more second statements comprises a statement that is incompatible with the set of information (and/or a determination that the one or more second statements comprises a statement that contradicts the set of information). In an example, the fourth statement (e.g., "John Billy retired from FreshMax in 1998 and never returned") may be determined to be in conflict with and/or be incompatible with the fifth statement (e.g., "John Billy stayed with FreshMax until 2000, when he retired for personal reasons"). For example, a set of information of the fourth statement (e.g., retirement of John Billy from FreshMax in 1998 and no longer working for FreshMax afterwards) is incompatible with the fifth statement indicating that John Billy was with FreshMax until 2000.

In some examples, one or more validity scores associated with the one or more second statements may be determined. The one or more validity scores may be associated with one or more content items comprising the one or more second statements. In some examples, the one or more validity scores may be comprised within the validity score data structure. For example, the one or more validity scores may be determined by analyzing the validity score data structure based upon the one or more content items to identify the one or more validity scores. Alternatively and/or additionally, the one or more validity scores may be determined based upon the one or more content items using one or more of the techniques presented herein.

In some examples, the first validity score may be generated based upon the comparison information and/or the one or more validity scores associated with the one or more content items comprising the one or more second statements. In an example, a comparison validity score may be generated based upon the comparison information and/or the one or more validity scores. In some examples, responsive to a determination that a content item of the one or more content items is associated with a validity score that does not meet a threshold validity score, the content item (and/or a statement of the one or more statements comprised within the content item) may not be used for determining the first validity score and/or the comparison validity score. For example, a comparison determination associated with the one or more first statements and/or the content item (and/or a statement of the one or more second statements) may not be included in the comparison information and/or the comparison determination may be removed from the comparison information (e.g., the comparison determination may correspond to a determination that a set of information of the one or more first statements is compatible with and/or is corroborated by the content item and/or a determination that a set of information of the one or more first statements is in conflict with and/or is incompatible with the content item).

In an example, the first validity score and/or the comparison validity score may be generated based upon a proportion of sets of information of the one or more first statements that are compatible with the one or more second statements. Alternatively and/or additionally, the comparison validity score may be generated based upon a proportion of sets of information of the one or more first statements that are corroborated by (and/or supported by) the one or more second statements. Alternatively and/or additionally, the comparison validity score may be generated based upon a proportion of sets of information of the one or more first statements that are in conflict with (and/or are incompatible with) the one or more second statements. Alternatively and/or additionally, the comparison validity score may be generated based upon a quantity of content items, of the one or more content items, that are compatible with (and/or that corroborate) the one or more first statements. Alternatively and/or additionally, the comparison validity score may be generated based upon a quantity of content items, of the one or more content items, that are in conflict with (and/or are incompatible with) the one or more first statements.

Figure 5C:
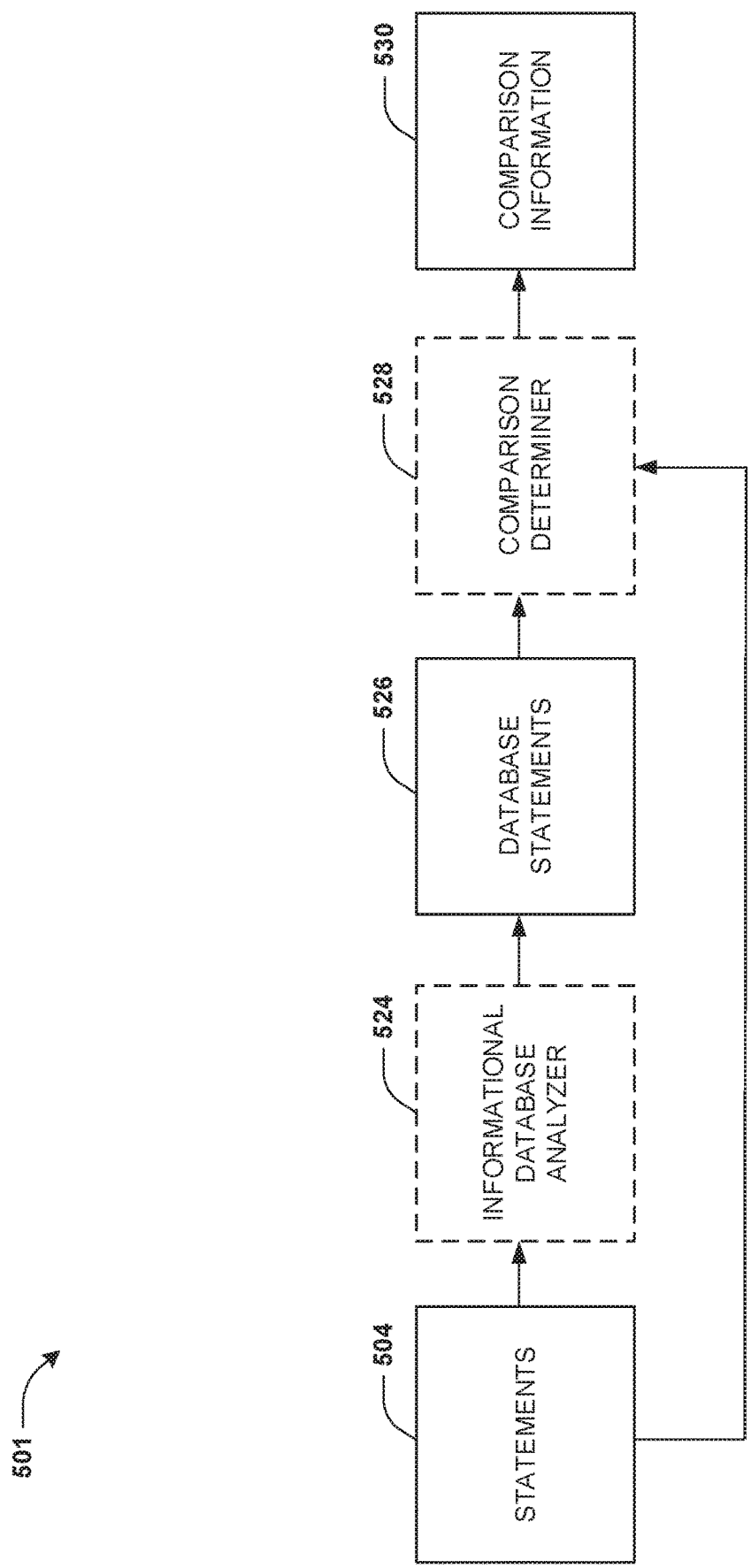
FIG. 5C is a diagram illustrating an exemplary system for generating validity scores associated with content items and/or controlling graphical user interfaces of client devices based upon the validity scores, where comparison information is determined.
Figure 5D:
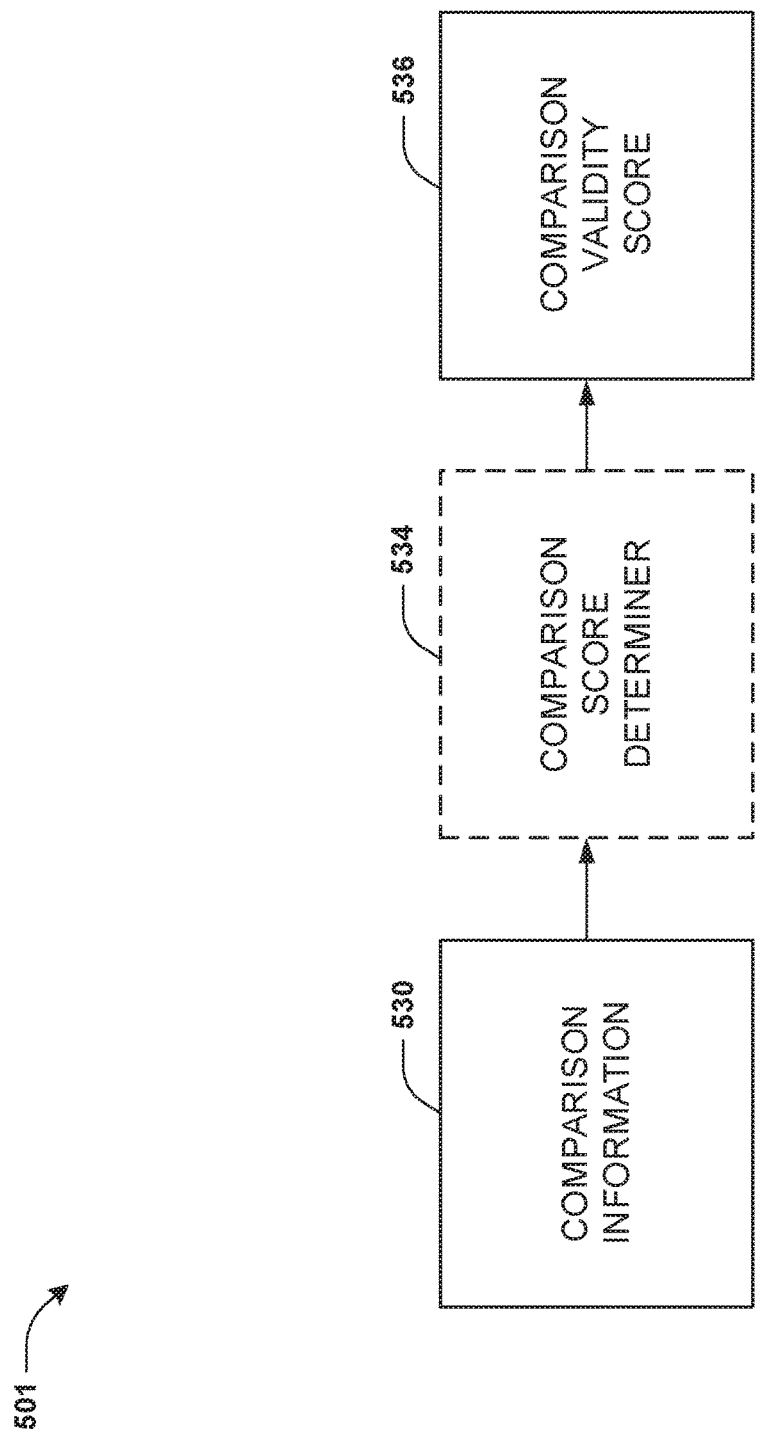
FIG. 5D is a diagram illustrating an exemplary system for generating validity scores associated with content items and/or controlling graphical user interfaces of client devices based upon the validity scores, where a comparison validity score is determined.

FIGS. 5C-5D illustrate an exemplary scenario where the comparison information and/or the comparison validity score are determined. FIG. 5C illustrates the comparison information being determined. The first set of statements 504 may be input to an informational database analyzer 524. The informational database analyzer 524 may analyze one or more informational databases based upon the first set of statements 504 to identify a second set of statements 526 associated with the first set of statements 504. In an example, the one or more second statements may comprise the second set of statements 526. The first set of statements 504 and/or the second set of statements 526 may be input to a comparison determiner 528. The comparison determiner 528 may compare the first set of statements 504 with the second set of statements 526 to determine the comparison information. For example, the comparison determiner 528 may output information 530 comprising the comparison information.

FIG. 5D illustrates the comparison validity score being determined. The information 530 comprising the comparison information may be input to a comparison score determiner 534. The comparison score determiner 534 may determine the comparison validity score based upon the comparison information. For example, the comparison score determiner 534 may output information 536 comprising the comparison validity score.

In some examples, one or more requests for an evaluation of the one or more first statements may be transmitted to one or more first client devices associated with the first topic. In some examples, a request of the one or more requests may correspond to a request for a user of a client device of the one or more first client devices to evaluate the one or more first statements for validity. In an example, the user may be an expert having knowledge about the first topic. In an example where the first topic corresponds to International Law, the user may be an expert on International Law. In some examples, the one or more first client devices may be identified (and/or selected for transmission of the one or more requests) based upon an expert database. For example, the expert database may be indicative of a plurality of sets of client devices associated with a plurality of topics. A set of client devices of the plurality of sets of client devices may comprise one or more client devices associated with a topic of the plurality of topics. For example, the expert database may be analyzed based upon the first topic to identify a first set of client devices, comprising the one or more first client devices, associated with the first topic.

In some examples, one or more evaluations of the one or more first statements may be received from the one or more first client devices. For example, an evaluation of the one or more evaluations may comprise an indication that at least a portion of the one or more first statements is valid (e.g., correct and/or accurate) and/or an indication that at least a portion of the one or more first statements is invalid (e.g., incorrect and/or misleading). In some examples, the first validity score may be generated based upon the one or more evaluations. In an example, an evaluation validity score may be generated based upon the one or more evaluations.

In an example, the first validity score and/or the evaluation validity score may be generated based upon a proportion of evaluations of the one or more evaluations that are indicative of the one or more first statements being valid. Alternatively and/or additionally, the first validity score and/or the evaluation validity score may be generated based upon a proportion of evaluations of the one or more evaluations that are indicative of at least a portion of the one or more first statements being invalid. Alternatively and/or additionally, the first validity score and/or the evaluation validity score may be generated based upon a proportion of one or more portions of the one or more first statements that are identified by the one or more evaluations as being valid. Alternatively and/or additionally, the first validity score and/or the evaluation validity score may be generated based upon a proportion of one or more portions of the one or more first statements that are identified by the one or more evaluations as being invalid.

Figure 5E:
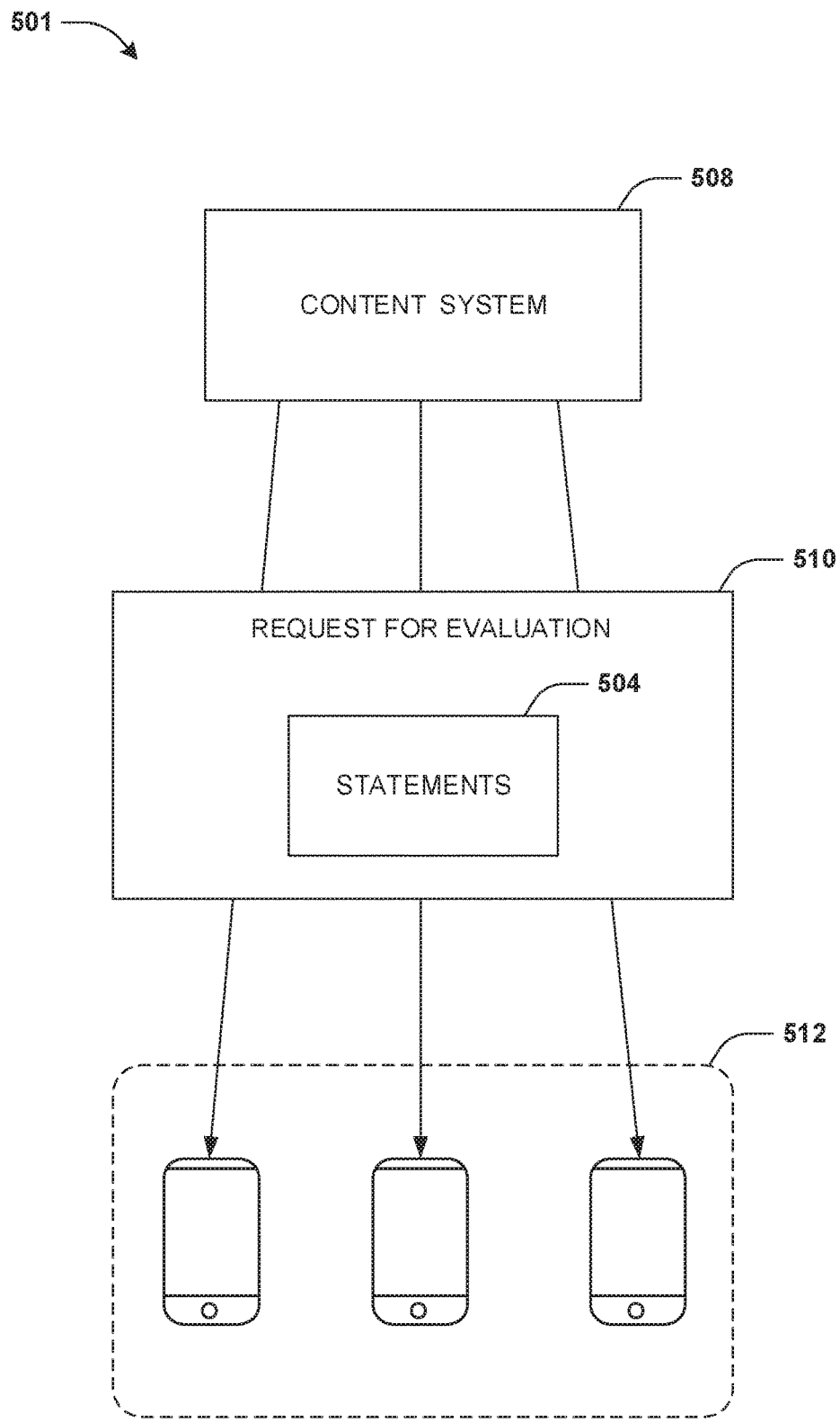
FIG. 5E is a diagram illustrating an exemplary system for generating validity scores associated with content items and/or controlling graphical user interfaces of client devices based upon the validity scores, where a first set of evaluation requests is transmitted to a first set of client devices.
Figure 5F:
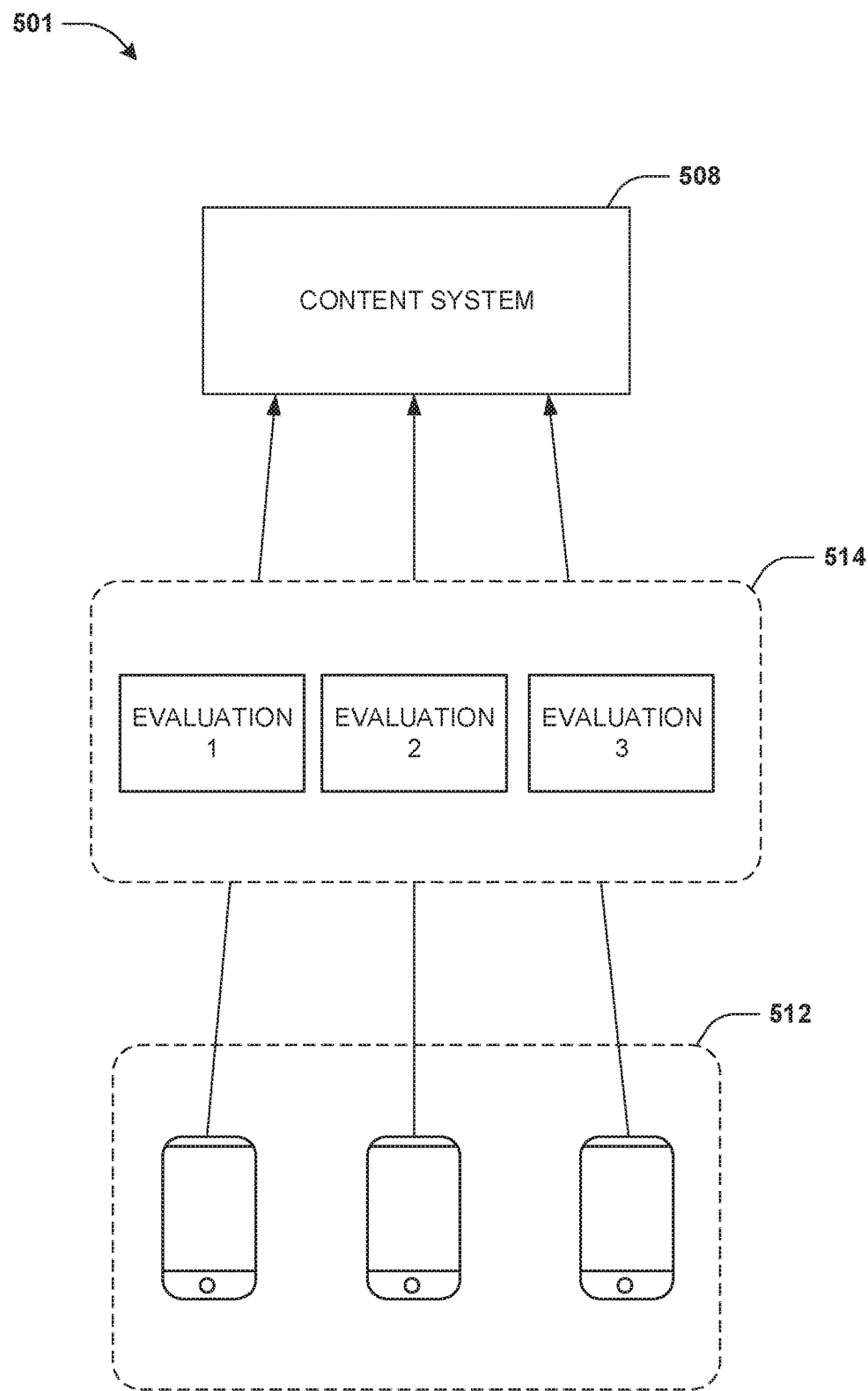
FIG. 5F is a diagram illustrating an exemplary system for generating validity scores associated with content items and/or controlling graphical user interfaces of client devices based upon the validity scores, where a first set of evaluations is received by a server from a first set of client devices.
Figure 5G:
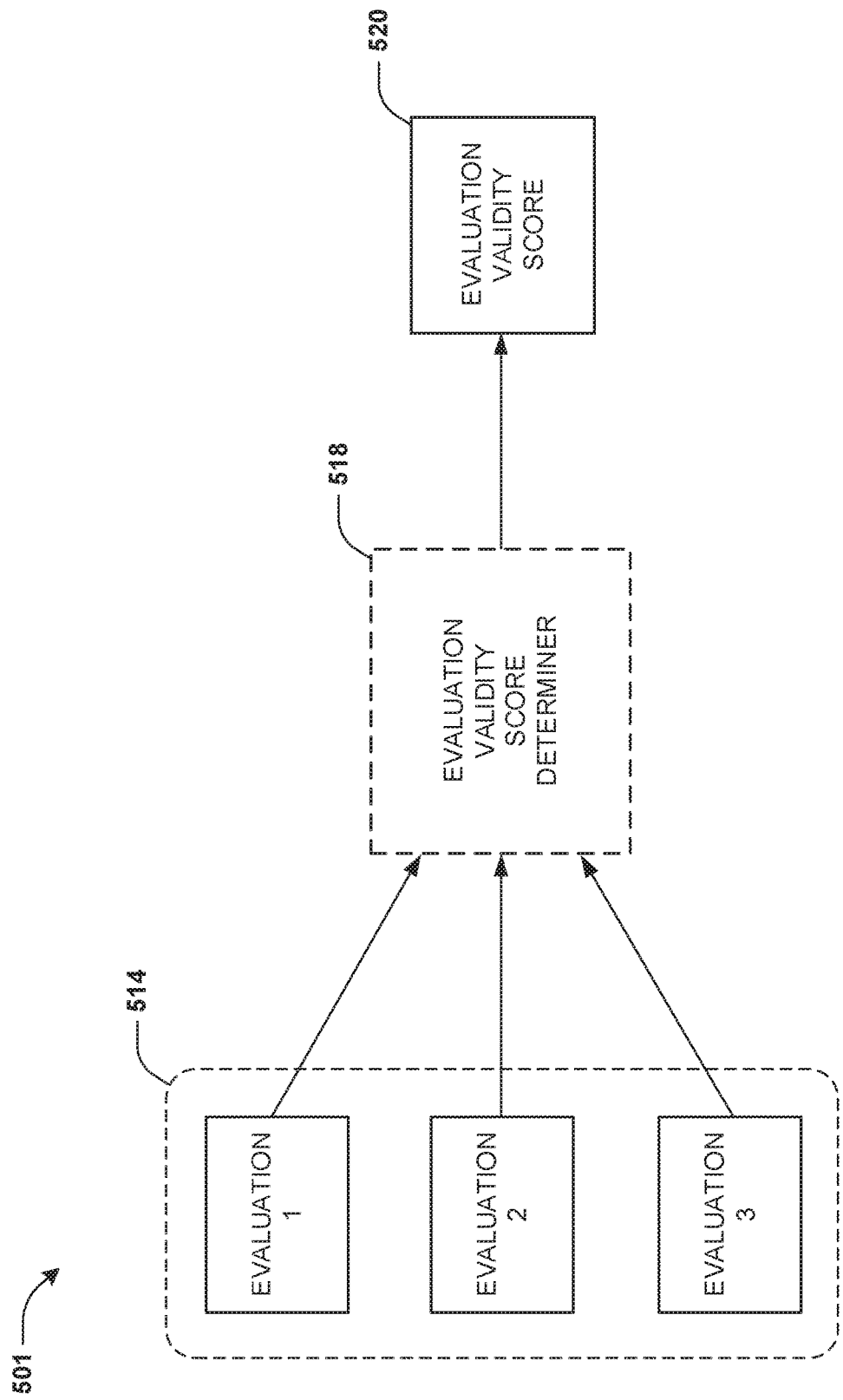
FIG. 5G is a diagram illustrating an exemplary system for generating validity scores associated with content items and/or controlling graphical user interfaces of client devices based upon the validity scores, where an evaluation validity score is determined based upon a first set of evaluations.

FIGS. 5E-5G illustrate an exemplary scenario where the evaluation validity score is determined. FIG. 5E illustrates a first set of evaluation requests 510 being transmitted to a first set of client devices 512. The first set of evaluation requests 510 may be transmitted by a server 508 associated with the content system. In an example, the one or more requests for an evaluation of the one or more first statements may comprise the first set of evaluation requests 510. For example, a request of the first set of evaluation requests 510 may comprise the first set of statements 504 (e.g., the one or more first statements). In an example, the one or more first client devices associated with the first topic may comprise the first set of client devices 512.

FIG. 5F illustrates a first set of evaluations 514 (e.g., "EVALUATION 1", "EVALUATION 2" and/or "EVALUATION 3") being received by the server 508 from the first set of client devices 512. In an example, the one or more evaluations may comprise the first set of evaluations 514. FIG. 5G illustrates the evaluation validity score being determined based upon the first set of evaluations 514. In some examples, the first set of evaluations 514 may be input to an evaluation score determiner 518. The evaluation validity score determiner 518 may determine the evaluation validity score based upon the first set of evaluations 514. For example, the evaluation validity score determiner 518 may output information 520 comprising the evaluation validity score.

In some examples, the validity information associated with the validity services may be analyzed based upon the first content item to identify a seventh set of validity information associated with the first content item. For example, the seventh set of validity information may comprise at least one of one or more fact-checking reports related to the first content item, one or more verification reports related to the first content item, one or more peer-review articles related to the first content item, one or more critiques related to the first content item, one or more editorials related to the first content item, one or more content reviews related to the first content item, etc.

In some examples, the first validity score and/or the evaluation validity score may be generated based upon the seventh set of validity information. The seventh set of validity information may be analyzed to identify one or more indications that at least a portion of the first content item is valid (e.g., correct and/or accurate) and/or an indication that at least a portion of the first content item is invalid (e.g., incorrect and/or misleading). In an example, the first validity score and/or the evaluation validity score may be generated based upon a proportion of information of the seventh set of validity information that is indicative of at least a portion of the first content item being valid. Alternatively and/or additionally, the first validity score and/or the evaluation validity score may be generated based upon a proportion of information of the seventh set of validity information that is indicative of at least a portion of the first content item being invalid. Alternatively and/or additionally, the first validity score and/or the evaluation validity score may be generated based upon a proportion of one or more portions of the first content item that are identified by the seventh set of validity information as being valid. Alternatively and/or additionally, the first validity score and/or the evaluation validity score may be generated based upon a proportion of one or more portions of the first content item that are identified by the seventh set of validity information as being invalid.

In some examples, the first validity score may be generated based upon a verifiability score associated with the first content item. For example, the verifiability score may be determined based upon an amount of content of the first content item that comprises verifiable information. In some examples, the first content item may be analyzed to determine verifiable content of the first content item. For example, the verifiability score may be determined based upon a proportion of the first content item corresponding to the verifiable content (e.g., a proportion of the first content item that is verifiable). Content that is verifiable may comprise information that is objective (e.g., content that is not merely an opinion of a creator of the content). Alternatively and/or additionally, content that is verifiable may comprise information that is also discussed by other resources and/or can be verified using the other resources.

In some examples, the first validity score may be generated based upon a plurality of scores comprising the content type validity score, the topic validity score, the publisher validity score, the author validity score, the producer validity score, the source validity score, the comparison validity score, the evaluation validity score and/or the verifiability score. Alternatively and/or additionally, the first validity score may be generated based upon a plurality of weights associated with the plurality of scores. For example, one or more operations (e.g., mathematical operations) may be performed using the plurality of scores and/or the plurality of weights to generate the first validity score.

In some examples, the plurality of weights may be determined based upon one or more validity score settings. In an example, the one or more validity score settings may be set by a device via a settings interface associated with settings for generation of validity scores. Settings information may be received via the settings interface. The settings information may be indicative of the plurality of weights. Alternatively and/or additionally, the settings information may be indicative of criteria to be used for generation of the first validity score.

In an example where the first validity score is presented via a client device in association with the first content item and/or the first validity score is used to determine whether to present the first content item via the client device, the one or more validity score settings may be set by the client device. In an example where the first validity score is used for determining a bid value associated with presenting a content item (e.g., an advertisement) concurrently with the first content item, the one or more validity score settings may be set by a device associated with an entity associated with the content item. Alternatively and/or additionally, the one or more validity settings may be set automatically, such as by the content system.

In an example, the criteria may be indicative of authors, publishers and/or comparisons with other content. Accordingly, the first validity score may be generated based upon the author validity score, the publisher validity score and/or the comparison validity score. For example, a weight of the plurality of weights associated with the content type validity score may be set to zero, a weight of the plurality of weights associated with the topic validity score may be set to zero, a weight of the plurality of weights associated with the producer validity score may be set to zero and/or a weight of the plurality of weights associated with the evaluation validity score may be set to zero.

In an example, the settings information may be indicative of a first weight associated with authors, a second weight associated with publishers and/or a third weight associated with comparisons with other content. In an example, the first weight may correspond to an amount of influence that the author validity score has on generation of the first validity score, the second weight may correspond to an amount of influence that the publisher validity score has on generation of the first validity score and/or the third weight may correspond to an amount of influence that the comparison validity score has on generation of the first validity score.

Alternatively and/or additionally, the first weight may be indicative of a first proportion (e.g., a percentage, such as 20%) of the first validity score (to which the author validity score contributes), the second weight may be indicative of a second proportion (e.g., a percentage, such as 30%) of the first validity score (to which the publisher validity score contributes) and/or the third weight may be indicative of a third proportion (e.g., a percentage, such as 50%) of the first validity score (to which the comparison validity score contributes). One or more operations (e.g., mathematical operations) may be performed using the author validity score, the publisher validity score and/or the comparison validity score based upon the first weight, the second weight and/or the third weight to generate the first validity score.

For example, the plurality of weights may be applied to the plurality of scores to generate a plurality of weighted scores. In an example one or more operations (e.g., mathematical operations) may be performed using the plurality of weights and/or the plurality of scores to generate the plurality of weighted scores. In an example, the author validity score may be combined with the first weight to determine a weighted author validity score (e.g., in an example where the first weight corresponds to 20%, the author validity score may be multiplied by 0.2 to determine the weighted author validity score). In an example, the publisher validity score may be combined with the second weight to determine a weighted publisher validity score (e.g., in an example where the second weight corresponds to 30%, the publisher validity score may be multiplied by 0.3 to determine the weighted publisher validity score). In an example, the comparison validity score may be combined with the third weight to determine a weighted comparison validity score (e.g., in an example where the third weight corresponds to 50%, the comparison validity score may be multiplied by 0.5 to determine the weighted comparison validity score). The weighted author validity score, the weighted publisher validity score and/or the weighted comparison validity score may be combined (e.g., added together) to determine the first validity score.

Alternatively and/or additionally, the one or more validity score settings and/or the settings information may be indicative of criteria for generation of the first validity score comprising one or more different characteristics of the first set of content information different than the first type of content, the first topic, the first publisher, the first author, the first producer, the one or more first statements, the comparison information and/or the one or more evaluations. For example, the first validity score may be generated based upon the one or more different characteristics.

Figure 5H:
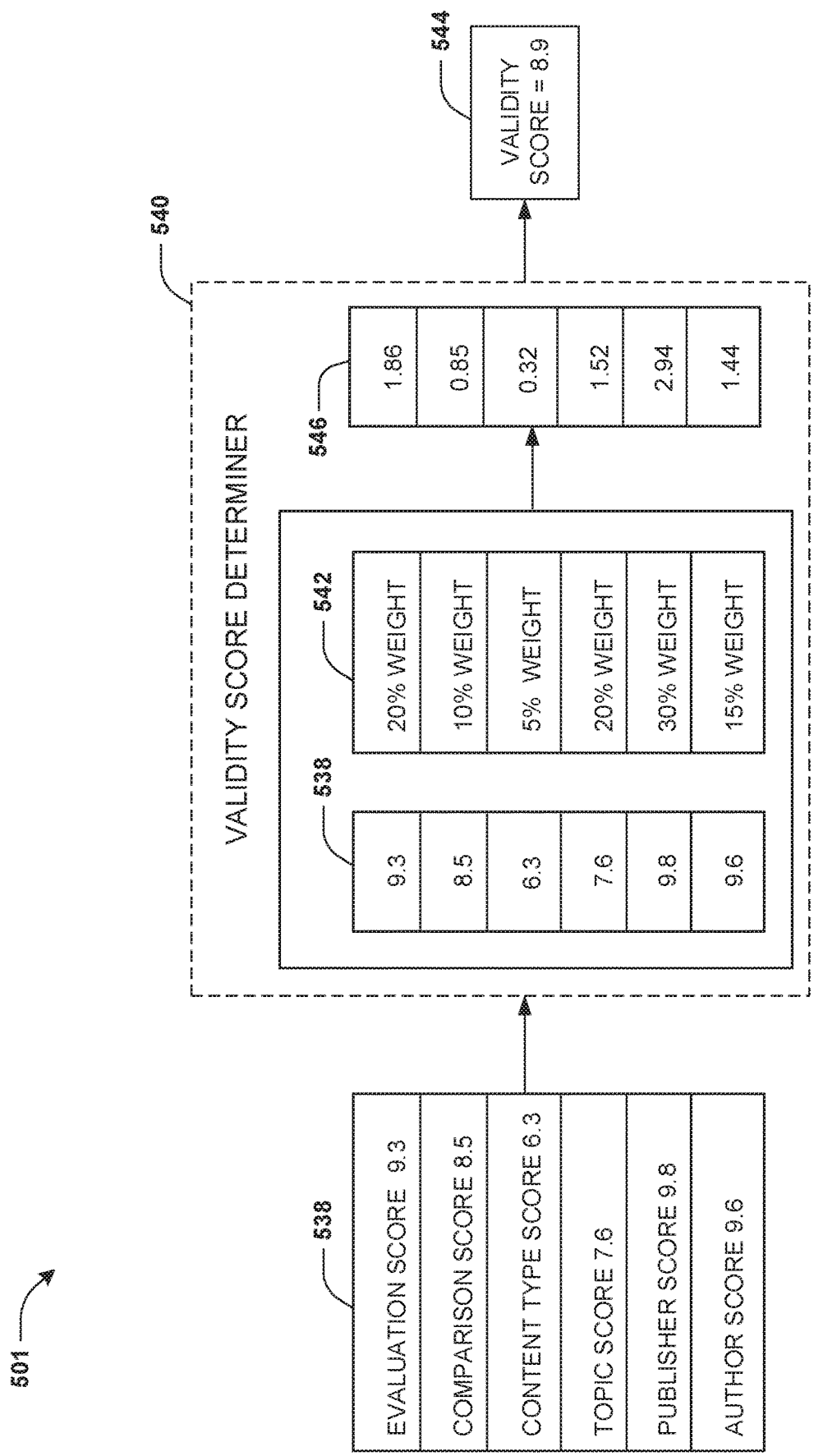
FIG. 5H is a diagram illustrating an exemplary system for generating validity scores associated with content items and/or controlling graphical user interfaces of client devices based upon the validity scores, where a first validity score is determined.

FIG. 5H illustrates the first validity score being determined. In an example, the one or more validity score settings and/or the settings information may be indicative of criteria for generation of the first validity score. The criteria may correspond to the evaluation validity score, the comparison validity score, the content type validity score, the topic validity score, the publisher validity score and/or the author validity score. A second plurality of scores 538 associated with the criteria may be determined. In some examples, the one or more validity score settings and/or the settings information may be indicative of a second plurality of weights 542 associated with the second plurality of scores 538.

In an example, the evaluation validity score may be 9.3 (where 10 or a different number may be a maximum score), the comparison validity score may be 8.5, the content type validity score may be 6.3, the topic validity score may be 7.6, the publisher validity score may be 9.8 and/or the author validity score may be 9.6. In an example, the second plurality of weights 542 may comprise a first weight of 20% associated with the evaluation validity score. The first weight of 20% may indicate that the evaluation validity score contributes to 20% of the first validity score. Alternatively and/or additionally, the second plurality of weights 542 may comprise a second weight of 10% associated with the comparison validity score, a third weight of 5% associated with the content type validity score, a fourth weight of 20% associated with the topic validity score, a fifth weight of 30% associated with the publisher validity score and/or a sixth weight of 15% associated with the author validity score.

In some examples, a validity score determiner 540 may determine the first validity score 544 based upon the second plurality of scores 538 and/or the second plurality of weights 542. In an example, a plurality of weighted scores 546 may be determined by the validity score determiner 540 based upon the second plurality of scores 538 and/or the second plurality of weights 542. For example, a first weighted score may be determined based upon the evaluation validity score and/or the first weight (e.g., 9.3×0.2=1.86). Alternatively and/or additionally, a second weighted score may be determined based upon the comparison validity score and/or the second weight (e.g., 8.5×0.1=0.85). Alternatively and/or additionally, a third weighted score may be determined based upon the content type validity score and/or the third weight (e.g., 6.3×0.05=0.32). Alternatively and/or additionally, a fourth weighted score may be determined based upon the topic validity score and/or the fourth weight (e.g., 7.6×0.2=1.52). Alternatively and/or additionally, a fifth weighted score may be determined based upon the publisher validity score and/or the fifth weight (e.g., 9.8×0.3=2.94). Alternatively and/or additionally, a sixth weighted score may be determined based upon the author validity score and/or the sixth weight (e.g., 9.6×0.15=1.44). In some examples, the plurality of weighted scores 546 may be combined (e.g., added together) to determine the first validity score. For example, the first validity score may correspond to 8.9 (where 10 or a different number may be a maximum validity score). In some examples, the validity score determiner 540 may output information 544 comprising the first validity score. It may be appreciated that techniques presented herein for determining the first validity score based upon the second plurality of scores 538 and/or the second plurality of weights 542 are merely exemplary and embodiments using other techniques for determining the first validity score based upon the second plurality of scores 538 and/or the second plurality of weights 542 are contemplated.

At 408, a graphical user interface of a first client device may be controlled based upon the first validity score. For example, the first validity score may be displayed via the first client device. Alternatively and/or additionally, content may be selected for presentation via the first client device based upon the first validity score. Alternatively and/or additionally, presentation of content items via the first client device may be performed based upon the first validity score and/or one or more other validity scores.

For example, the first client device may access and/or interact with one or more services, such as one or more web pages, one or more applications, one or more content interfaces, etc. for viewing and/or downloading content items from one or more servers associated with the content system. For example, the first client device may display a content interface to consume content items associated with the content system.

In an example, a content list may be generated for presentation via the content interface. In some examples, a plurality of content items comprising the first content item may be identified. The content list may be generated based upon the plurality of content items. For example, one or more content items may be selected for inclusion in the content list based upon a plurality of validity scores associated with the plurality of content items. For example, the one or more content items may be selected based upon a determination that one or more validity scores (of the plurality of validity scores) associated with the one or more content items meet a first threshold validity score. In an example, the first content item may be selected for inclusion in the content list based upon a determination that the first validity score associated with the first content item meets the first threshold validity score.

In some examples, the first threshold validity score may be determined based upon one or more threshold validity settings associated with the first client device (and/or associated with a user account of the first client device with the content system). For example, the one or more threshold validity settings may be received via the content interface (and/or via a threshold validity settings interface). Alternatively and/or additionally, the one or more threshold validity settings interface may be indicative of a plurality of threshold validity scores. A threshold validity score of the plurality of threshold validity scores may be associated with a type of content and/or a topic. For example, the first threshold validity score may be associated with the first type of content and/or the first topic. In an example, the first validity score associated with the first content item may be compared with the first threshold validity score (rather than a different validity score of the plurality of threshold validity scores) based upon a determination that the first threshold validity score is associated with the first type of content and/or the first topic. In an example, a threshold validity score of the plurality of threshold validity scores may be associated with science research papers (e.g., content corresponding to science research papers may be compared with the threshold validity score for determining whether to include the content in a content list) and/or a different threshold validity score of the plurality of threshold validity scores may be associated with politics news articles (e.g., content corresponding to politics news articles may be compared with the different threshold validity score for determining whether to include the content in a content list). It may be appreciated that by using different threshold validity scores for different topics and/or different types of content may result in more accurate and precise transmission of content to a user based on requirements associated with each topic and/or each type of content (e.g., the user may want a threshold validity score associated with science research papers to be higher than a threshold validity score associated with celebrity news articles because the user may require science research papers having a high level of validity and/or accuracy).

In some examples, the content list may comprise one or more list items associated with the one or more content items. In an example, the one or more list items of the content list may be arranged in rows and/or in a different type of arrangement. Alternatively and/or additionally, a list item of the one or more list items associated with a content item of the one or more content items may comprise a graphical object (e.g., a picture associated with the content item and/or a topic associated with the content item and/or in an example where the content item comprises a video, a video frame of the video), a title (and/or a label) associated with the content item and/or a summary associated with the content item. In some examples, responsive to a selection of a list item of the content list, the content interface may present a content item associated with the list item (e.g., the content item may be accessed and/or downloaded by the first client device).

In some examples, the content interface may display a content list comprising a plurality of list items associated with a plurality of content items. The plurality of list items may be ordered and/or arranged based upon a plurality of validity scores associated with the plurality of content items. The plurality of content items may comprise the first content item and/or the plurality of validity scores may comprise the first validity score associated with the first content item. In an example, the first validity score associated with the first content item may be greater than a second validity score associated with a different content item of the plurality of content items. The content list may comprise a first list item associated with the first content item and/or a second list item associated with the different content item. The first list item and/or the second list item may be ordered and/or arranged based upon a determination that the first validity score associated with the first content item is greater than the second validity score associated with the different content item. In an example, the first list item may be above the second list item based upon the determination that the first validity score associated with the first content item is greater than the second validity score associated with the different content item. Alternatively and/or additionally, the content interface may present the first list item prior to presenting the second list item based upon the determination that the first validity score associated with the first content item is greater than the second validity score associated with the different content item.

In some examples, the content interface may display a content list comprising a plurality of list items associated with a plurality of content items. The content list may display a plurality of validity scores associated with the plurality of content items. The plurality of content items may comprise the first content item and/or the plurality of validity scores may comprise the first validity score associated with the first content item. The content list may comprise a first list item associated with the first content item. In an example, the first validity score may be displayed within the first list item and/or adjacent to the first list item (and/or in a different location of the content list located such that the first user viewing the content list identifies the first validity score as being associated with the first content item). Alternatively and/or additionally, a second validity score associated with a different content item may be displayed within a second list item associated with the different content item and/or adjacent to the second list item (and/or in a different location of the content list located such that the first user viewing the content list identifies the second validity score as being associated with the different content item).

Figure 5I:
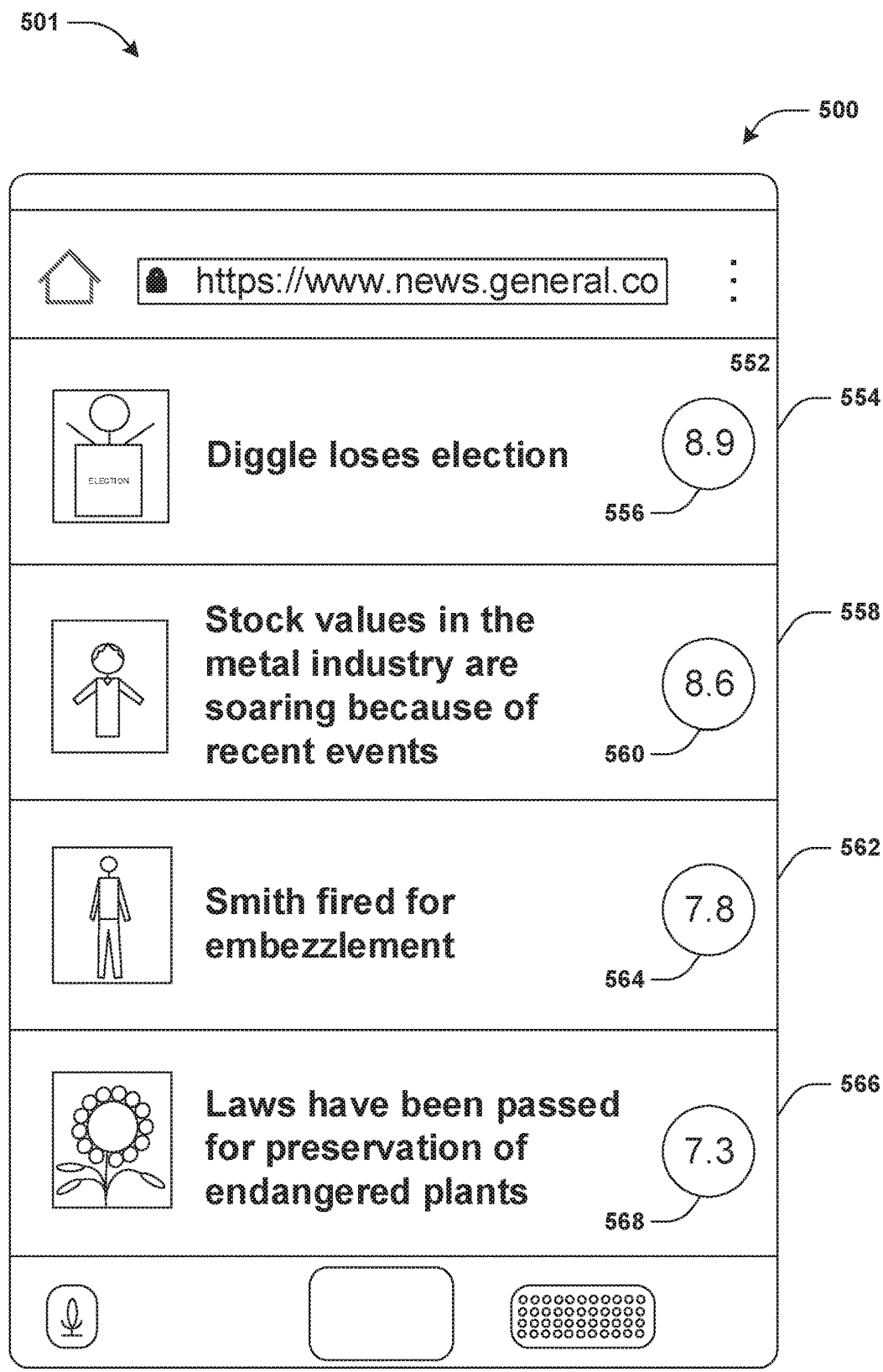
FIG. 5I is a diagram illustrating an exemplary system for generating validity scores associated with content items and/or controlling graphical user interfaces of client devices based upon the validity scores, where a device displays a content list.

FIG. 5I illustrates an exemplary scenario where a device 500 displays a content list. In an example, the first client device may comprise the device 500. The content list may be displayed via a web page 552. The content list may comprise a set of list items associated with a set of content items comprising the article 502 (e.g., the first content item). For example, the set of list items may comprise a first list item 554 associated with the article 502 and/or other list items 558, 562 and/or 566 associated with other content items. In some examples, the set of list items of the content list may be ordered and/or arranged based upon validity scores associated with the set of content items. The validity scores may comprise the first validity score associated with the article 502. The first list item 554 may be positioned above the other list items 558, 562 and/or 566 based upon a determination that the first validity score is greater than other validity scores. In some examples, the content list may comprise a set of validity score representations associated with the set of content items. The set of validity score representations may comprise a first validity score representation 556 (representative of the first validity score) associated with the article 502 and/or other validity score representations 560, 564 and/or 568 associated with other content items. For example, the first validity score representation 556 may be displayed within and/or overlaying the first list item 554.

In some examples, the content interface may display the first validity score concurrently with the first content item. For example, a content list comprising one or more list items associated with one or more content items may be presented via the content interface. The first content item and/or the first validity score may be presented responsive to a selection of a list item, of the content list, associated with the first content item. For example, the first validity score may be displayed overlaying the first content item, adjacent to the first content item, within the first content item and/or in a different location (of the content interface).

Figure 5J:
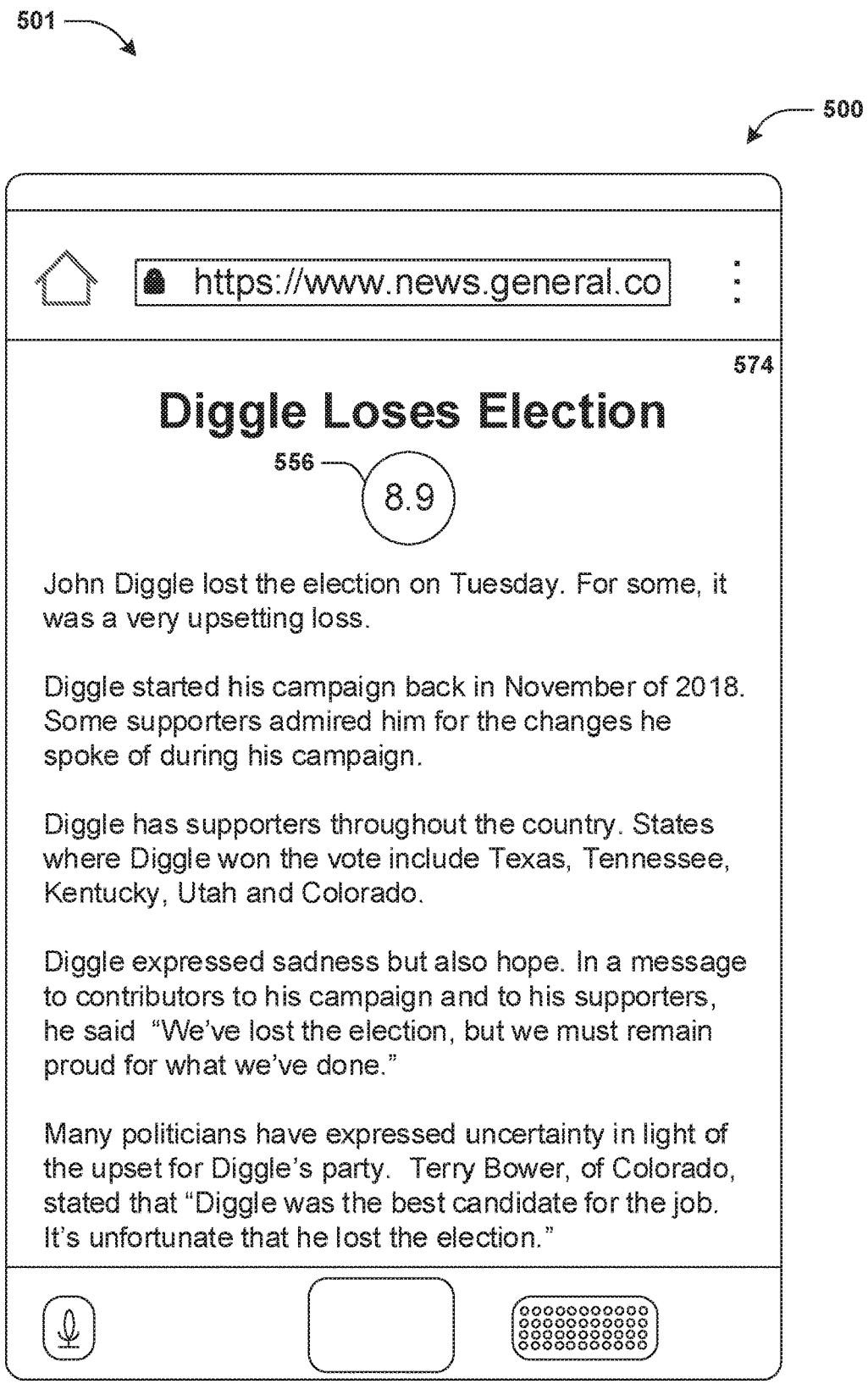
FIG. 5J is a diagram illustrating an exemplary system for generating validity scores associated with content items and/or controlling graphical user interfaces of client devices based upon the validity scores, where a device displays a first validity score representation concurrently with an article.

FIG. 5J illustrates an exemplary scenario where the device 500 displays the first validity score representation 556 concurrently with the article 502 (e.g., the first content item). In an example, the first validity score representation 556 and/or the article 502 may be displayed responsive to a selection of the first list item 554 associated with the article 502. For example, a web page 574 comprising the article 502 and/or the first validity score representation 556 may be accessed and/or presented responsive to the selection of the first list item 554.

In some examples, such as in an example where the first content item is identified within an image and/or a video captured and/or recorded by a device, the first validity score may be displayed via a display device associated with the device. For example, the device may correspond to at least one of a smartphone camera, a camera of a wearable device (e.g., a smart glasses computer comprising a camera, a headset comprising a camera, a smart watch comprising a camera, etc.), a standalone camera (e.g., a security camera), etc. A notification comprising the first validity score may be transmitted to the device (and/or to a different device associated with the device). The notification comprising the first validity score may be displayed by the display device. In some examples, the display device may correspond to a laptop screen of a laptop, a phone screen of a smartphone, a computer monitor, a display of a car (e.g., a head-up display (HUD) of the car) and/or a display of a smart glasses computer (e.g., an HUD of the smart glasses computer).

In some examples, content items may be selected for presentation via the first client device based upon validity scores associated with content items. In an example, the content interface may display the first content item based upon a determination that the first validity score meets the first threshold validity score (and/or a different threshold validity score).

In some examples, the content system may be associated with an advertisement system. Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, a first entity may access and/or interact with a service, such as an advertising service, that provides a platform for uploading, to the content system, content to be presented via client devices. In some examples, the first entity may be an advertiser, a company, a brand, an organization, etc. One or more content items (e.g., one or more advertisements) associated with the first entity may be received from a device associated with the first entity. The one or more content items may be associated with one or more products, one or more services, etc. associated with the first entity. For example, the first entity may upload, to the content system, the one or more content items. The one or more content items may be associated with a content campaign for promoting the one or more products and/or the one or more services associated with the first entity. Alternatively and/or additionally, content campaign information associated with the content campaign may be received from the device associated with the first entity. For example, the content campaign information may comprise one or more of a first budget associated with the content campaign, a first target spend pattern associated with the content campaign, a duration of time for which the one or more content items shall be presented by the content system, one or more campaign goals associated with the content campaign and/or the one or more content items (e.g., a number of impressions associated with the one or more content items, a number of interactions associated with the one or more content items, a number of conversion events performed as a result of the content campaign, etc.), etc. In some examples, the one or more content items may comprise a second content item.

In some examples, campaign validity information associated with the first entity and/or the content campaign may be received from the device associated with the first entity. For example, the campaign validity information may be included in the content campaign information (and/or the campaign validity information may be received separately from the content campaign information). In some examples, the campaign validity information may be indicative of one or more validity score settings associated with generation of validity scores. For example, the campaign validity information may be indicative of criteria to be used for generation of validity scores associated with content items using one or more of the techniques presented herein. Alternatively and/or additionally, the campaign validity information may be indicative of a plurality of weights to be used for generation of validity scores associated with content items (e.g., the plurality of weights may correspond to weights to be applied to content type validity scores, topic scores, etc. associated with content items to generate validity scores using one or more of the techniques presented herein). Alternatively and/or additionally, the campaign validity information may be indicative of a second threshold validity score.

In an example, a first request for content associated with the first client device may be received. The first request for content may correspond to a request to be provided with a content item (e.g., an advertisement, an image, a link, a video, etc.) for presentation on a first internet resource (e.g., one or more of a web page of a website associated with the content system, an application associated with the content system, etc.) that comprises the first content item. The first request for content may be received responsive to the first client device accessing the first internet resource associated with the content system. For example, the first client device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the first client device.

In some examples, responsive to receiving the first request for content, a first plurality of content items may be selected from a database associated with the content system. In some examples, a bidding process may be performed to select one or more content items from a first plurality of content items participating in a first auction (e.g., an auction for selection of one or more content items to present via the first client device). For example, responsive to receiving the first request for content, the first plurality of content items may be selected from a database associated with the content system. In some examples, the first plurality of content items may be selected based upon a determination that a format and/or a structure associated with the first internet resources matches formats and/or structures associated with content items of the plurality of content items.

In some examples, the first plurality of content items may be selected (e.g., selected for inclusion in the first auction) based upon a determination that a validity score associated with the first content item meets a plurality of threshold validity scores associated with the first plurality of content items. In some examples, the plurality of threshold validity scores may be determined based upon information received from entities (e.g., advertisers, companies, brands, organizations, etc.) associated with the first plurality of content items.

Alternatively and/or additionally, the first plurality of content items may be selected (e.g., selected for inclusion in the first auction) based upon a determination that a first plurality of validity scores associated with the first content item meets the plurality of threshold validity scores associated with the first plurality of content items. For example, a validity score of the first plurality of validity scores (and/or each validity score of the first plurality of validity scores) may be generated based upon the first content item. Alternatively and/or additionally, the plurality of validity scores may be generated based upon sets of campaign validity information associated with the first plurality of content items. For example, a set of campaign validity information associated with a content item of the first plurality of content items may be received from an entity associated with the content item. In some examples, an exemplary content item may be selected for inclusion in the first plurality of content items (e.g., selected for inclusion in the first auction) based upon a determination that a validity score associated with the first content item, generated based upon a set of campaign validity information associated with the exemplary content item, meets a threshold validity score indicated by the set of campaign validity information associated with the exemplary content item (e.g., the set of campaign validity information may be received from an entity associated with the exemplary content item).

In an example, a second validity score (of the first plurality of validity scores) associated with the first content item may be generated based upon the campaign validity information associated with the first entity and/or the content campaign. For example, the second validity score may be generated using one or more of the techniques presented herein based upon criteria indicated by the campaign validity information and/or a plurality of weights indicated by the campaign validity information. Alternatively and/or additionally, the second content item (associated with the first entity and/or the content campaign) may be selected for inclusion in the first plurality of content items based upon a determination that the second validity score meets the second threshold validity score indicated by the campaign validity information.

In an example, a third validity score (of the first plurality of validity scores) associated with the first content item may be generated based upon second campaign validity information associated with a second entity and/or a second content campaign. The second entity and/or the second content campaign may be associated with one or more content items comprising a third content item. The second campaign validity information may be received from a device associated with the second entity. For example, the third validity score may be generated using one or more of the techniques presented herein based upon criteria indicated by the second campaign validity information and/or a plurality of weights indicated by the second campaign validity information. Alternatively and/or additionally, the third content item (associated with the second entity and/or the second content campaign) may be selected for inclusion in the first plurality of content items based upon a determination that the third validity score meets a third threshold validity score indicated by the second campaign validity information.

In some examples, a first plurality of bid values associated with the first plurality of content items may be determined based upon one or more validity scores. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. Alternatively and/or additionally, the first plurality of bid values may be determined based upon the first validity score. In an example, a bid value of the first plurality of bid values may be determined based upon the first validity score and/or a budget associated with a content item of the first plurality of content items.

In some examples, the first plurality of bid values may be determined based upon the first plurality of validity scores. In an example, a first bid value (of the first plurality of bid values) associated with the second content item may be determined based upon the second validity score. In some examples, a lower value of the second validity score may correspond to a lower value of the first bid value. Alternatively and/or additionally, an initial bid value associated with the second content item may be determined (e.g., the initial bid value may be determined based upon a budget and/or a target spend pattern associated with the first entity). The first bid value may be determined based upon the initial bid value, the second validity score and/or a set of validity-bid relationship information associated with the first entity (e.g., the set of validity-bid relationship information may be received from the first entity). The set of validity-bid relationship information may be indicative of one or more bid factors associated with one or more validity score values. The set of validity-bid relationship information may be analyzed based upon the second validity score to identify a validity score value of the one or more validity score values (e.g., the second validity score may be equal to the validity score value). A first bid factor of the one or more bid factors may be identified based upon the validity score value (e.g., the first bid value may be associated with the validity score value). One or more operations (e.g., mathematical operations) may be performed using the initial bid value and/or the first bid factor to determine the first bid value (e.g., the initial bid value and the first bid factor may be combined, such as multiplied, to determine the first bid value). Alternatively and/or additionally, the validity-bid relationship information may be indicative of a function (e.g., a mathematical function). For example, the function may be applied to the second validity score to generate a bid factor (e.g., the bid factor and/or the initial bid value may be used to determine the first bid value).

In an example, a second bid value (of the first plurality of bid values) associated with the third content item may be determined based upon the third validity score. The second bid value may be determined based upon a second set of validity-bid relationship information associated with the third content item using one or more of the techniques presented herein.

In some examples, the second content item may be selected from the first plurality of content items for presentation via the first client device based upon the first plurality of bid values. For example, the second content item may be selected from the first plurality of content items based upon a determination that the first bid value associated with the second content item exceeds a threshold bid value. Alternatively and/or additionally, the second content item may be selected from the first plurality of content items based upon a determination that the first bid value is a highest bid value of the first plurality of bid values.

Alternatively and/or additionally, a first plurality of content item scores may be determined. For example, the first plurality of content items scores may be determined based upon the first plurality of bid values and/or a first plurality of click probabilities. The first plurality of click probabilities may be determined based upon content information associated with the first plurality of content items and/or a first user profile associated with the first client device. In some examples, the first user profile may comprise demographic information, such as an age (and/or age range), family size, gender, occupation, income, and/or other demographic information associated with the first user. Alternatively and/or additionally, the first user profile may comprise activity information associated with the first client device and/or a user account associated with the first client device. For example, the activity information may be indicative of at least one of one or more consumed content items (e.g., a content item consumed by the first user, such as at least one of an article, a video, an audio file, an image, a webpage, an advertisement, an email, a message, etc.), one or more accessed content items (e.g., a content item accessed by the first client device), one or more selected content items (e.g., a content item selected via the client device), one or more content item interactions (e.g., an advertisement impression, an advertisement click, a conversion associated with an advertisement, etc.), etc.

In some examples, a click probability of the first plurality of click probabilities may correspond to a probability of receiving a selection of a content item responsive to presenting the content item via the first client device. Alternatively and/or additionally, a click probability of the first plurality of click probabilities may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device.

In some examples, the second content item may be selected from the first plurality of content items for presentation via the first client device based upon the first plurality of content item scores. For example, the second content item may be selected from the first plurality of content items based upon a determination that a first content item score associated with the second content item exceeds a threshold content item score. Alternatively and/or additionally, the second content item may be selected from the first plurality of content items based upon a determination that the first content item score is a highest content item score of the first plurality of content item scores.

In some examples, the second content item may be transmitted to the first client device responsive to selecting the second content item for presentation via the first client device. The second content item may be presented via the first client device. For example, the second content item may be presented via the first internet resource on the first client device, such as while the first internet resource is accessed and/or displayed. For example, the first internet resource may present the second content item concurrently with the first content item.

Figure 5K:
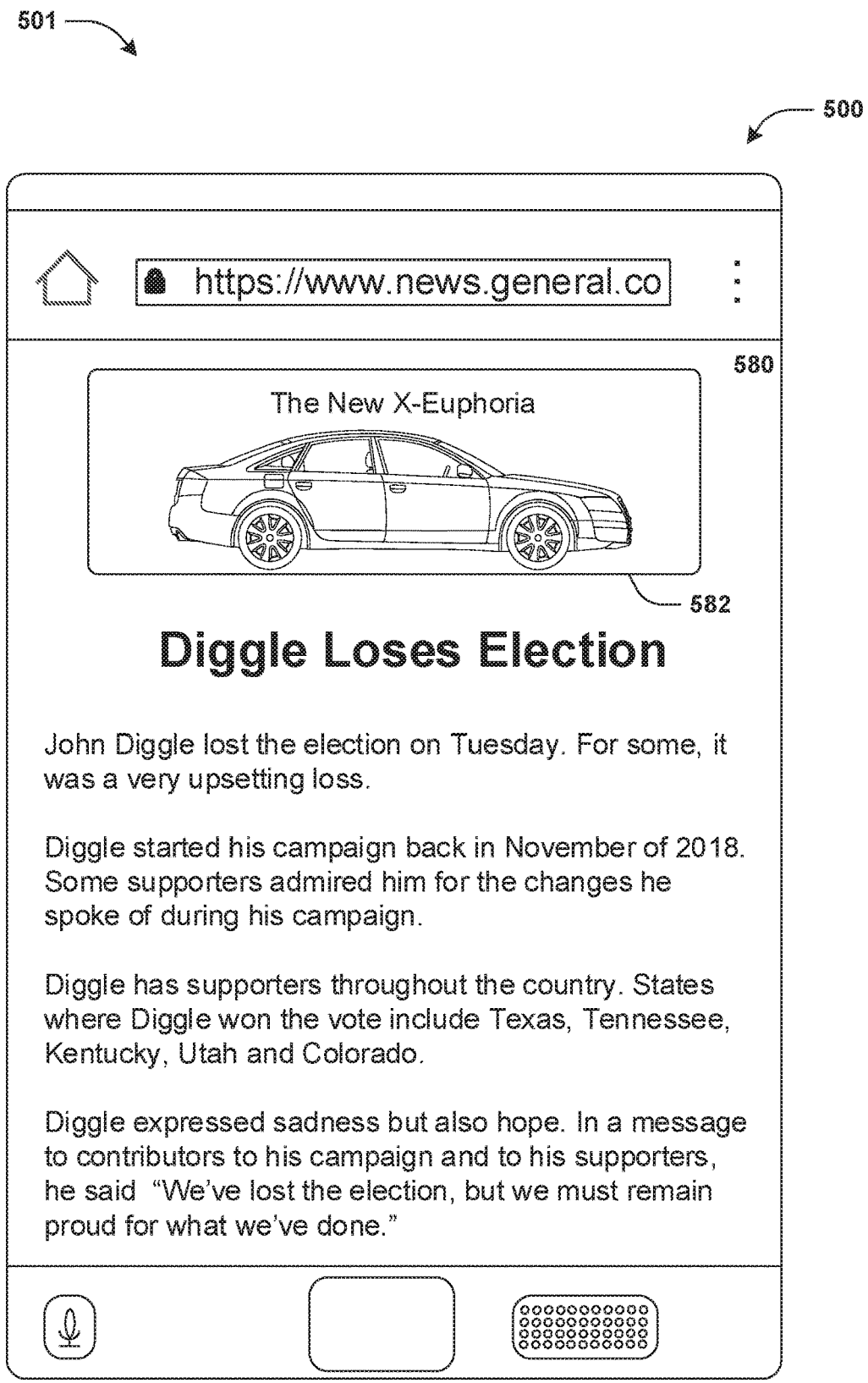
FIG. 5K is a diagram illustrating an exemplary system for generating validity scores associated with content items and/or controlling graphical user interfaces of client devices based upon the validity scores, where a second content item is displayed on a first internet resource.

FIG. 5K illustrates an exemplary scenario where the second content item is displayed on the first internet resource. For example, the first internet resource may comprise a web page 580. The second content item may comprise a graphical object 582 (e.g., an advertisement and/or a different type of content item). The first internet resource may display the graphical object 582 and the article (e.g., the first content item) concurrently.

It may be appreciated that the disclosed subject matter may assist a user (and/or a client device associated with the user) in viewing and/or consuming content that comprises valid, correct and/or accurate information and/or content that does not comprise invalid, incorrect and/or misleading information, such as misinformation. Alternatively and/or additionally, the disclosed subject matter may assist the user in determining whether content comprises valid, correct and/or accurate information and/or whether content comprises invalid, incorrect and/or misleading information. Alternatively and/or additionally, the disclosed subject matter may assist the user in automatically filtering out content using varying validity thresholds across various topics and/or types of content.

Alternatively and/or additionally, the disclosed subject matter may assist an entity (e.g., a company, a brand, etc.) in preventing damage to a reputation of the entity by not showing content items associated with the entity concurrently with content items comprising invalid, incorrect and/or misleading information, such that the entity is not interpreted as having an affiliation with providers of misleading, false and/or unproven information, such as misinformation.

Implementation of at least some of the disclosed subject matter may lead to benefits including, but not limited to, a reduction in screen space and/or an improved usability of a display (e.g., of the client device) (e.g., as a result of enabling the user to automatically consume content that is valid, correct and/or accurate, as a result of enabling the user to automatically determine whether content comprises invalid, incorrect and/or misleading information, where the user may not need to open a separate application and/or a separate window in order to determine whether content comprises valid, correct and/or accurate information, etc.).

Alternatively and/or additionally, implementation of at least some of the disclosed subject matter may lead to benefits including more accurate and precise transmission of content to intended users (e.g., as a result of automatically determining validity scores associated with content items, as a result of transmitting to a client device based upon a determination that a validity score associated with the client device exceeds a threshold validity score, etc.).

Alternatively and/or additionally, implementation of at least some of the disclosed subject matter may lead to benefits including less manual effort (e.g., as a result of automatically determining validity scores associated with content items, as a result of automatically transmitting content to client devices based upon the validity scores, such that a user and/or an entity is not required to manually research content to determine whether the content is valid, correct and/or accurate).

Alternatively and/or additionally, implementation of at least some of the disclosed subject matter may lead to benefits including a reduction in bandwidth (e.g., as a result of reducing a need for the user to search throughout the internet and/or navigate through internet content to find content comprising valid, correct and/or accurate information).

In some examples, at least some of the disclosed subject matter may be implemented on a client device, and in some examples, at least some of the disclosed subject matter may be implemented on a server (e.g., hosting a service accessible via a network, such as the Internet).

Figure 6:
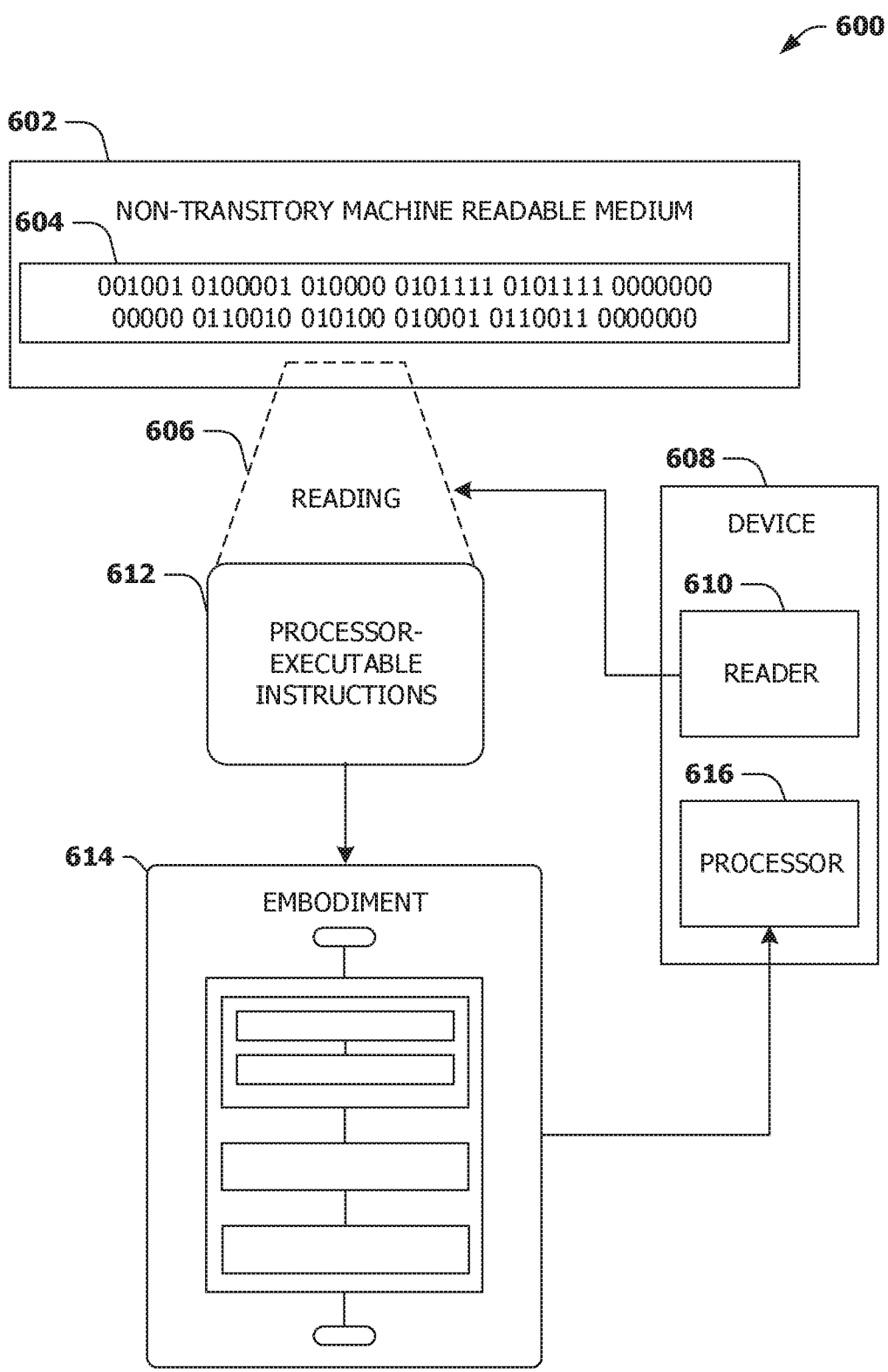
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 606 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5K, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    identifying a first content item;
    analyzing the first content item using at least one or more multi-label learning techniques to determine a first set of content information associated with the first content item, wherein the first set of content information is indicative of both:
        a type of content associated with the first content item; and
        a topic associated with the first content item;
    generating, based upon the first set of content information determined by analyzing the first content item using at least the one or more multi-label learning techniques, a plurality of validity scores for the first content item, wherein:
        the generating the plurality of validity scores for the first content item comprises:
            generating, based upon the type of content associated with the first content item, a content type validity score for the first content item, wherein the type of content is indicative of a content format of the first content item, wherein the content format of the first content item corresponds to the first content item being at least one of a book, an article, a news article, an educational article, a research paper, a blog post, a post on a forum, a video content item, a news-related video, a news channel video clip, an internet news video clip, an educational video, a how-to video, an educational video clip, a documentary, an entertainment video, a sports-related video clip, an informational video, an interview-related video, a video clip of a meeting, an audio content item, a news-related audio segment, a podcast, music, an email, an email from an organization, an email comprising content about an issue, a subscription-based email, virtual reality (VR) content, augmented reality (AR) content, mixed reality (MR) content or extended reality (XR) content; and
            generating, based upon the topic associated with the first content item, a topic validity score for the first content item, wherein the topic is indicative of at least one of (i) one or more topics associated with subject matter of the first content item and determined using one or more named-entity recognition (NER) techniques and comparing the first content item to one or more informational resources or (ii) one or more entities associated with the first content item and determined using one or more multi-label learning (MLL) techniques and comparing the first content item to one or more informational resources; and the plurality of validity scores comprises the content type validity score and the topic validity score;

generating, based upon the plurality of validity scores including both (i) the content type validity score corresponding to the content format of the first content item and (ii) the topic validity score corresponding to the topic of the first content item, a first validity score for the first content item corresponding to at least one of a validity of one or more statements expressed by the first content item, an authenticity of the one or more statements expressed by the first content item or a correctness of the one or more statements expressed by the first content item; and controlling a graphical user interface of a first client device based upon the first validity score.

2. The method of claim 1, wherein the analyzing the first content item to determine the first set of content information comprises:

analyzing the first content item to identify the one or more statements within the first content item, wherein the first set of content information is indicative of the one or more statements.

3. The method of claim 2, comprising:

analyzing an informational database based upon the one or more statements to identify one or more second statements associated with the one or more statements; and comparing the one or more statements with the one or more second statements to determine comparison information, wherein the comparison information is indicative of at least one of:

one or more first sets of information of the one or more statements compatible with the one or more second statements; or one or more second sets of information of the one or more statements in conflict with the one or more second statements, wherein the generating the first validity score is performed based upon the comparison information.

4. The method of claim 3, comprising:

determining one or more validity scores associated with the one or more second statements, wherein the generating the first validity score is performed based upon the one or more validity scores.

5. The method of claim 2, comprising:

transmitting a request for an evaluation of the one or more statements to one or more client devices associated with the topic, wherein the request comprises the one or more statements; and receiving one or more evaluations of the one or more statements from the one or more client devices, wherein an evaluation of the one or more evaluations comprises at least one of:

an indication that at least a portion of the one or more statements is valid; or an indication that at least a portion of the one or more statements is invalid, wherein the generating the first validity score is performed based upon the one or more evaluations.

6. The method of claim 1, wherein the controlling the graphical user interface comprises:

displaying a list comprising a plurality of list items associated with a plurality of content items, wherein the plurality of list items comprises a first list item associated with the first content item; and displaying the first validity score at least one of within the first list item or adjacent to the first list item.

7. The method of claim 1, comprising:

identifying a plurality of content items comprising the first content item; and selecting one or more content items for inclusion in a list, wherein:

the one or more content items comprise the first content item;

the selecting the one or more content items comprises selecting the first content item for inclusion in the list based upon a determination that the first validity score meets a threshold validity score; and the controlling the graphical user interface comprises displaying the list comprising one or more list items associated with the one or more content items.

8. The method of claim 1, wherein the first validity score corresponds to at least one of a validity of one or more assertions of fact expressed by the first content item, an authenticity of the one or more assertions of fact expressed by the first content item or a correctness of the one or more assertions of fact expressed by the first content item.

9. The method of claim 1, wherein the first validity score corresponds to at least one of a validity of two or more assertions of fact expressed by the first content item, an authenticity of the two or more assertions of fact expressed by the first content item or a correctness of the two or more assertions of fact expressed by the first content item.

10. The method of claim 1, comprising:

receiving a request for content associated with the first client device, wherein the request for content corresponds to a request to be provided with a content item for presentation on an internet resource comprising the first content item;

determining a plurality of click probabilities associated with a plurality of content items based upon the first validity score, wherein each click probability of the plurality of click probabilities corresponds to a probability of receiving at least one of a selection of a corresponding content item by a user of a client device or a positive signal indicative of one or more user interactions with the corresponding content item by the user of the client device; and selecting, based upon the plurality of click probabilities, a second content item for presentation via the first client device, wherein the controlling the graphical user interface comprises presenting the second content item via the first client device.

11. The method of claim 10, comprising:

prior to the selecting the second content item for presentation via the first client device, receiving, from a device associated with a third content item of a content item database, a threshold validity score; and selecting the third content item from the content item database for inclusion in the plurality of content items based upon a determination that the first validity score meets the threshold validity score.

12. The method of claim 1, wherein:

the generating the plurality of validity scores further comprises:

generating, based upon a publisher determined, during the analyzing the first content item, to be associated with the first content item, a publisher validity score;

generating, based upon an author determined, during the analyzing the first content item, to be associated with the first content item, an author validity score; and generating, based upon a producer determined, during the analyzing the first content item, to be associated with the first content item, a producer validity score; and the plurality of validity scores comprises the content type validity score, the topic validity score, the publisher validity score, the author validity score and the producer validity score.

13. The method of claim 1, comprising:
determining one or more validity score settings associated with the first client device, wherein the one or more validity score settings are set by a device via a settings interface associated with settings for generation of validity scores; and
determining, based upon the one or more validity score settings, a plurality of weights associated with the plurality of validity scores, wherein:
each weight of the plurality of weights is associated with a validity score of the plurality of validity scores; and
the generating the first validity score is performed based upon the plurality of weights.

14. The method of claim 1, comprising:
determining a first set of content items, different than the first content item, associated with the same publisher associated with the first content item;
analyzing a validity score database to identify a first set of validity scores associated with the first set of content items, wherein each content item of the first set of content items is published within a period of time;
determining a second set of content items, different than the first content item, associated with the same author associated with the first content item; and
analyzing the validity score database to identify a second set of validity scores associated with the second set of content items, wherein:
each content item of the second set of content items is published within the period of time; and
the generating the first validity score is performed based upon the first set of validity scores associated with the publisher and the second set of validity scores associated with the author.

15. The method of claim 1, comprising:
determining a set of content items, different than the first content item, associated with at least one of the same type of content associated with the first content item or the same topic associated with the first content item; and
analyzing a validity score database to identify a set of validity scores associated with the set of content items, wherein the generating the first validity score is performed based upon the set of validity scores.

16. The method of claim 1, comprising:
determining a set of content items, different than the first content item, associated with at least one of the same publisher associated with the first content item or the same producer associated with the first content item; and
analyzing a validity score database to identify a set of validity scores associated with the set of content items, wherein the generating the first validity score is performed based upon the set of validity scores.

17. The method of claim 1, comprising:
determining a set of content items, different than the first content item, associated with the same author associated with the first content item; and analyzing a validity score database to identify a set of validity scores associated with the set of content items, wherein the generating the first validity score is performed based upon the set of validity scores associated with the author.

18. A computing device comprising:
a processor; and
memory comprising processor-executable instructions that when executed by the processor cause performance of operations, the operations comprising:
identifying a first content item;
analyzing the first content item to determine a first set of content information associated with the first content item, wherein the first set of content information is indicative of both:
a type of content associated with the first content item; and
a topic associated with the first content item;
generating, based upon the first set of content information determined by analyzing the first content item, a plurality of validity scores for the first content item, wherein:
the generating the plurality of validity scores for the first content item comprises:
generating, based upon the type of content associated with the first content item, a content type validity score for the first content item, wherein the type of content is indicative of a content format of the first content item, wherein the content format of the first content item corresponds to the first content item being at least one of a book, an article, a news article, an educational article, a research paper, a blog post, a post on a forum, a video content item, a news-related video, a news channel video clip, an internet news video clip, an educational video, a how-to video, an educational video clip, a documentary, an entertainment video, a sports-related video clip, an informational video, an interview-related video, a video clip of a meeting, an audio content item, a news-related audio segment, a podcast, music, an email, an email from an organization, an email comprising content about an issue, a subscription-based email, virtual reality (VR) content, augmented reality (AR) content, mixed reality (MR) content or extended reality (XR) content; and
generating, based upon the topic associated with the first content item, a topic validity score for the first content item, wherein the topic is indicative of at least one of (i) one or more topics associated with subject matter of the first content item and determined using one or more named-entity recognition (NER) techniques and comparing the first content item to one or more informational resources or (ii) one or more entities associated with the first content item and determined using one or more multi-label learning (MLL) techniques and comparing the first content item to one or more informational resources; and
the plurality of validity scores comprises the content type validity score and the topic validity score;
generating, based upon the plurality of validity scores including both (i) the content type validity score corresponding to the content format of the first content item and (ii) the topic validity score corresponding to the topic of the first content item, a first validity score for the first content item corresponding to at least one of a validity of one or more statements expressed by the first content item, an authenticity of the one or more statements expressed by the first content item or a correctness of the one or more statements expressed by the first content item;

receiving a request for content associated with a first client device, wherein the request for content corresponds to a request to be provided with a content item for presentation on an internet resource comprising the first content item;

determining a plurality of click probabilities associated with a plurality of content items based upon one or more validity scores associated with the first content item, wherein the one or more validity scores comprise the first validity score, wherein each click probability of the plurality of click probabilities corresponds to a probability of receiving at least one of a selection of a corresponding content item by a user of a client device or a positive signal indicative of one or more user interactions with the corresponding content item by the user of the client device;

selecting, based upon the plurality of click probabilities, a second content item for presentation via the first client device; and presenting the second content item via the first client device.

19. The computing device of claim 18, the operations comprising:

prior to the selecting the second content item for presentation via the first client device, receiving, from a device associated with a third content item of a content item database, a threshold validity score determined based upon one or more threshold validity settings received via a threshold validity settings interface; and selecting the third content item from the content item database for inclusion in the plurality of content items based upon a determination that the first validity score meets the threshold validity score.

20. A non-transitory machine readable medium having stored thereon processor-executable instructions that when executed cause performance of operations, the operations comprising:

identifying a first content item;

analyzing the first content item to determine a first set of content information associated with the first content item;

generating, based upon the first set of content information determined by analyzing the first content item, a plurality of validity scores for the first content item, wherein:

the generating the plurality of validity scores for the first content item comprises both:

generating, based upon a type of content associated with the first content item, a content type validity score for the first content item, wherein the type of content is indicative of a content format of the first content item, wherein the content format of the first content item corresponds to the first content item being at least one of a book, an article, a news article, an educational article, a research paper, a blog post, a post on a forum, a video content item, a news-related video, a news channel video clip, an internet news video clip, an educational video, a how-to video, an educational video clip, a documentary, an entertainment video, a sports-related video clip, an informational video, an interview-related video, a video clip of a meeting, an audio content item, a news-related audio segment, a podcast, music, an email, an email from an organization, an email comprising content about an issue, a subscription-based email, virtual reality (VR) content, augmented reality (AR) content, mixed reality (MR) content or extended reality (XR) content; and generating, based upon a topic associated with the first content item, a topic validity score for the first content item, wherein the topic is indicative of at least one of (i) one or more topics associated with subject matter of the first content item and determined using one or more named-entity recognition (NER) techniques and comparing the first content item to one or more informational resources or (ii) one or more entities associated with the first content item and determined using one or more multi-label learning (MLL) techniques and comparing the first content item to one or more informational resources; and the plurality of validity scores comprises the content type validity score and the topic validity score;

generating, based upon the plurality of validity scores including both (i) the content type validity score corresponding to the content format of the first content item and (ii) the topic validity score corresponding to the topic of the first content item, a first validity score for the first content item corresponding to at least one of a validity of one or more statements expressed by the first content item, an authenticity of the one or more statements expressed by the first content item or a correctness of the one or more statements expressed by the first content item; and controlling a graphical user interface of a first client device based upon the first validity score.

* * * * *